(12) United States Patent
Drummond et al.

(10) Patent No.: US 8,106,347 B2
(45) Date of Patent: Jan. 31, 2012

(54) VEHICLE REARVIEW MIRROR SYSTEM

(75) Inventors: John P. Drummond, Glenageary (IE); Kenneth Schofield, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 13/037,440

(22) Filed: Mar. 1, 2011

(65) Prior Publication Data

US 2011/0147570 A1 Jun. 23, 2011

Related U.S. Application Data

(60) Continuation of application No. 12/766,150, filed on Apr. 23, 2010, now Pat. No. 7,906,756, which is a continuation of application No. 12/473,863, filed on May 28, 2009, now Pat. No. 7,728,276, which is a continuation of application No. 12/268,009, filed on Nov. 10, 2008, now Pat. No. 7,541,570, which is a continuation of application No. 12/029,172, filed on Feb. 11, 2008, now Pat. No. 7,453,057, which is a continuation of application No. 11/735,777, filed on Apr. 16, 2007, now Pat. No. 7,329,850, which is a continuation of application No. 10/955,694, filed on Sep. 30, 2004, now Pat. No. 7,205,524, which is a division of application No. 10/427,026, filed on Apr. 30, 2003, now Pat. No. 6,918,674.

(60) Provisional application No. 60/377,561, filed on May 3, 2002, provisional application No. 60/426,227, filed on Nov. 14, 2002.

(51) Int. Cl.
*H01J 40/14* (2006.01)
*G01J 1/44* (2006.01)

(52) U.S. Cl. .......... 250/214 AL; 250/214 C; 250/214 R; 250/205; 359/604

(58) Field of Classification Search .................. 250/221, 250/208.1, 216, 205, 214 R, 214 AL, 214 B, 250/214 C; 359/601, 602, 604, 605, 608, 359/609; 362/494, 540
See application file for complete search history.

(56) References Cited

U.S. PATENT DOCUMENTS 1,096,452 A 5/1914 Perrin
(Continued)

FOREIGN PATENT DOCUMENTS

AU A-40317/95 2/1995
(Continued)

OTHER PUBLICATIONS

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98a1.pdf.

(Continued)

*Primary Examiner* — Kevin Pyo
(74) *Attorney, Agent, or Firm* — Gardner, Linn, Burkhart & Flory, LLP

(57) ABSTRACT

A vehicular interior rearview mirror system includes an interior rearview mirror assembly, which includes an ambient light sensor operable to sense ambient light and a glare light sensor operable to sense glare light. A control is operable to establish a reflectance level of a transflective electrochromic reflective element of the mirror assembly and is responsive to light detection by the ambient light sensor and/or the glare light sensor. A backlit video screen is disposed behind the reflective element and is operable to display information through the mirror reflector of the reflective element. A display intensity control adjusts display intensity responsive to a light detection by the glare light sensor and/or the ambient light sensor and as a function of a ratio of a glare light value sensed by the glare light sensor to an ambient light value sensed by the ambient light sensor.

23 Claims, 10 Drawing Sheets

U.S. PATENT DOCUMENTS

| | | |
|---|---|---|
| 1,563,258 A | 11/1925 | Cunningham |
| 2,069,368 A | 2/1937 | Horinstein |
| 2,166,303 A | 7/1939 | Hodny et al. |
| 2,263,382 A | 11/1941 | Gotzinger |
| 2,414,223 A | 1/1947 | DeVirgilis |
| 2,457,348 A | 12/1948 | Chambers |
| 2,561,582 A | 7/1951 | Marbel |
| 2,580,014 A | 12/1951 | Gazda |
| 3,004,473 A | 10/1961 | Arthur et al. |
| 3,075,430 A | 1/1963 | Woodward et al. |
| 3,141,393 A | 7/1964 | Platt |
| 3,152,216 A | 10/1964 | Woodward |
| 3,162,008 A | 12/1964 | Berger et al. |
| 3,185,020 A | 5/1965 | Thelen |
| 3,266,016 A | 8/1966 | Maruyama et al. |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,467,465 A | 9/1969 | Van Noord |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,557,265 A | 1/1971 | Chisholm et al. |
| 3,565,985 A | 2/1971 | Schrenk et al. |
| 3,612,654 A | 10/1971 | Klein |
| 3,614,210 A | 10/1971 | Caplan |
| 3,628,851 A | 12/1971 | Robertson |
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,837,129 A | 9/1974 | Losell |
| 3,860,847 A | 1/1975 | Carley |
| 3,862,798 A | 1/1975 | Hopkins |
| 3,870,404 A | 3/1975 | Wilson et al. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,159,866 A | 7/1979 | Wunsch et al. |
| 4,161,653 A | 7/1979 | Bedini et al. |
| 4,171,875 A | 10/1979 | Taylor et al. |
| 4,174,152 A | 11/1979 | Gilia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| RE30,835 E | 12/1981 | Giglia |
| 4,306,768 A | 12/1981 | Egging |
| 4,310,851 A | 1/1982 | Pierrat |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,572,619 A | 2/1986 | Reininger et al. |
| 4,580,196 A | 4/1986 | Task |
| 4,581,827 A | 4/1986 | Higashi |
| 4,588,267 A | 5/1986 | Pastore |
| 4,603,946 A | 8/1986 | Kato et al. |
| 4,623,222 A | 11/1986 | Itoh et al. |
| 4,625,210 A | 11/1986 | Sagl |
| 4,626,850 A | 12/1986 | Chey |
| 4,630,040 A | 12/1986 | Haertling |
| 4,630,109 A | 12/1986 | Barton |
| 4,630,904 A | 12/1986 | Pastore |
| 4,634,835 A | 1/1987 | Suzuki |
| 4,635,033 A | 1/1987 | Inukai et al. |
| 4,636,782 A | 1/1987 | Nakamura et al. |
| 4,638,287 A | 1/1987 | Umebayashi et al. |
| 4,646,210 A | 2/1987 | Skogler et al. |
| 4,652,090 A | 3/1987 | Uchikawa et al. |
| 4,655,549 A | 4/1987 | Suzuki et al. |
| 4,665,311 A | 5/1987 | Cole |
| 4,665,430 A | 5/1987 | Hiroyasu |
| 4,669,827 A | 6/1987 | Fukada et al. |
| 4,671,615 A | 6/1987 | Fukada et al. |
| 4,671,619 A | 6/1987 | Kamimori et al. |
| 4,678,281 A | 7/1987 | Bauer |
| 4,679,906 A | 7/1987 | Brandenburg |
| 4,682,083 A | 7/1987 | Alley |
| 4,692,798 A | 9/1987 | Seko et al. |
| 4,694,295 A | 9/1987 | Miller et al. |
| 4,697,883 A | 10/1987 | Suzuki et al. |
| 4,701,022 A | 10/1987 | Jacob |
| 4,702,566 A | 10/1987 | Tukude et al. |
| 4,711,544 A | 12/1987 | Iino et al. |
| 4,712,879 A | 12/1987 | Lynam et al. |
| 4,713,685 A | 12/1987 | Nishimura et al. |
| RE32,576 E | 1/1988 | Pastore |
| 4,718,756 A | 1/1988 | Lancaster |
| 4,721,364 A | 1/1988 | Itoh et al. |
| 4,729,068 A | 3/1988 | Ohe |
| 4,729,076 A | 3/1988 | Masami et al. |
| 4,731,669 A | 3/1988 | Hayashi et al. |
| 4,733,335 A | 3/1988 | Serizawa et al. |
| 4,733,336 A | 3/1988 | Skogler et al. |
| 4,740,838 A | 4/1988 | Mase et al. |
| 4,761,061 A | 8/1988 | Nishiyama et al. |
| 4,773,740 A | 9/1988 | Kawakami et al. |
| 4,780,752 A | 10/1988 | Angerstein et al. |
| 4,781,436 A | 11/1988 | Armbruster |
| 4,789,904 A | 12/1988 | Peterson |
| 4,793,690 A | 12/1988 | Gahan et al. |
| 4,793,695 A | 12/1988 | Wada et al. |
| 4,794,261 A | 12/1988 | Rosen |

| Patent | Date | Inventor |
|---|---|---|
| D299,491 S | 1/1989 | Masuda |
| 4,799,768 A | 1/1989 | Gahan |
| 4,803,599 A | 2/1989 | Trine et al. |
| 4,807,096 A | 2/1989 | Skogler et al. |
| 4,820,933 A | 4/1989 | Hong et al. |
| 4,825,232 A | 4/1989 | Howdle |
| 4,826,289 A | 5/1989 | Vandenbrink et al. |
| 4,827,086 A | 5/1989 | Rockwell |
| 4,837,551 A | 6/1989 | Iino |
| 4,842,378 A | 6/1989 | Flasck et al. |
| 4,845,402 A | 7/1989 | Smith |
| 4,847,772 A | 7/1989 | Michalopoulos et al. |
| 4,855,161 A | 8/1989 | Moser et al. |
| 4,855,550 A | 8/1989 | Schultz, Jr. |
| 4,859,813 A | 8/1989 | Rockwell |
| 4,859,867 A | 8/1989 | Larson et al. |
| 4,860,171 A | 8/1989 | Kojima |
| 4,862,594 A | 9/1989 | Schierbeek et al. |
| 4,871,917 A | 10/1989 | O'Farrell et al. |
| 4,872,051 A | 10/1989 | Dye |
| 4,882,466 A | 11/1989 | Friel |
| 4,882,565 A | 11/1989 | Gallmeyer |
| 4,883,349 A | 11/1989 | Mittelhäuser |
| 4,884,135 A | 11/1989 | Schiffman |
| 4,886,960 A | 12/1989 | Molyneux et al. |
| 4,889,412 A | 12/1989 | Clerc et al. |
| 4,891,828 A | 1/1990 | Kawazoe |
| 4,892,345 A | 1/1990 | Rachael, III |
| 4,902,103 A | 2/1990 | Miyake et al. |
| 4,902,108 A | 2/1990 | Byker |
| 4,906,085 A | 3/1990 | Sugihara et al. |
| 4,909,606 A | 3/1990 | Wada et al. |
| 4,910,591 A | 3/1990 | Petrossian et al. |
| 4,916,374 A | 4/1990 | Schierbeek et al. |
| 4,926,170 A | 5/1990 | Beggs et al. |
| 4,930,742 A | 6/1990 | Schofield et al. |
| 4,933,814 A | 6/1990 | Sanai |
| 4,935,665 A | 6/1990 | Murata |
| 4,936,533 A | 6/1990 | Adams et al. |
| 4,937,796 A | 6/1990 | Tendler |
| 4,937,945 A | 7/1990 | Schofield et al. |
| 4,943,796 A | 7/1990 | Lee |
| 4,948,242 A | 8/1990 | Desmond et al. |
| 4,953,305 A | 9/1990 | Van Lente et al. |
| 4,956,591 A | 9/1990 | Schierbeek et al. |
| 4,957,349 A | 9/1990 | Clerc et al. |
| 4,959,247 A | 9/1990 | Moser et al. |
| 4,959,865 A | 9/1990 | Stettiner et al. |
| 4,970,653 A | 11/1990 | Kenue |
| 4,973,844 A | 11/1990 | O'Farrell et al. |
| 4,974,122 A | 11/1990 | Shaw |
| 4,978,196 A | 12/1990 | Suzuki et al. |
| 4,983,951 A | 1/1991 | Igarashi et al. |
| 4,985,809 A | 1/1991 | Matsui et al. |
| 4,987,357 A | 1/1991 | Masaki |
| 4,996,083 A | 2/1991 | Moser et al. |
| 5,001,386 A | 3/1991 | Sullivan et al. |
| 5,001,558 A | 3/1991 | Burley et al. |
| 5,005,213 A | 4/1991 | Hanson et al. |
| 5,006,971 A | 4/1991 | Jenkins |
| 5,014,167 A | 5/1991 | Roberts |
| 5,016,988 A | 5/1991 | Iimura |
| 5,016,996 A | 5/1991 | Ueno |
| 5,017,903 A | 5/1991 | Krippelz, Sr. |
| 5,018,839 A | 5/1991 | Yamamoto et al. |
| 5,027,200 A | 6/1991 | Petrossian et al. |
| 5,037,182 A | 8/1991 | Groves et al. |
| 5,038,255 A | 8/1991 | Nishihashi et al. |
| 5,052,163 A | 10/1991 | Czekala |
| 5,056,899 A | 10/1991 | Warszawski |
| 5,057,974 A | 10/1991 | Mizobe |
| 5,058,851 A | 10/1991 | Lawlor et al. |
| 5,059,015 A | 10/1991 | Tran |
| 5,066,108 A | 11/1991 | McDonald |
| 5,066,112 A | 11/1991 | Lynam et al. |
| 5,069,535 A | 12/1991 | Baucke et al. |
| 5,070,323 A | 12/1991 | Iino et al. |
| 5,073,012 A | 12/1991 | Lynam |
| 5,076,673 A | 12/1991 | Lynam et al. |
| 5,076,674 A | 12/1991 | Lynam |
| 5,078,480 A | 1/1992 | Warszawski |
| 5,096,287 A | 3/1992 | Kakinami et al. |
| 5,100,095 A | 3/1992 | Haan et al. |
| 5,101,139 A | 3/1992 | Lechter |
| 5,105,127 A | 4/1992 | Lavaud et al. |
| 5,115,346 A | 5/1992 | Lynam |
| 5,117,346 A | 5/1992 | Gard |
| 5,119,220 A | 6/1992 | Narita et al. |
| 5,121,200 A | 6/1992 | Choi |
| 5,122,619 A | 6/1992 | Dlubak |
| 5,123,077 A | 6/1992 | Endo et al. |
| 5,124,845 A | 6/1992 | Shimojo |
| 5,124,890 A | 6/1992 | Choi et al. |
| 5,128,799 A | 7/1992 | Byker |
| 5,130,898 A | 7/1992 | Akahane |
| 5,131,154 A | 7/1992 | Schierbeek et al. |
| 5,134,507 A | 7/1992 | Ishii |
| 5,134,549 A | 7/1992 | Yokoyama |
| 5,135,298 A | 8/1992 | Feltman |
| 5,136,483 A | 8/1992 | Schöniger et al. |
| 5,140,455 A | 8/1992 | Varaprasad et al. |
| 5,140,465 A | 8/1992 | Yasui et al. |
| 5,142,407 A | 8/1992 | Varaprasad et al. |
| 5,145,609 A | 9/1992 | Varaprasad et al. |
| 5,150,232 A | 9/1992 | Gunkima et al. |
| 5,151,816 A | 9/1992 | Varaprasad et al. |
| 5,151,824 A | 9/1992 | O'Farrell |
| 5,154,617 A | 10/1992 | Suman et al. |
| 5,158,638 A | 10/1992 | Osanami et al. |
| 5,160,200 A | 11/1992 | Cheselske |
| 5,160,201 A | 11/1992 | Wrobel |
| 5,168,378 A | 12/1992 | Black et al. |
| 5,173,881 A | 12/1992 | Sindle |
| 5,177,031 A | 1/1993 | Buchmann et al. |
| 5,178,448 A | 1/1993 | Adams et al. |
| 5,179,471 A | 1/1993 | Caskey et al. |
| 5,183,099 A | 2/1993 | Bechu |
| 5,184,956 A | 2/1993 | Langlarais et al. |
| 5,189,537 A | 2/1993 | O'Farrell |
| 5,193,029 A | 3/1993 | Schofield et al. |
| 5,197,562 A | 3/1993 | Kakinami et al. |
| 5,202,950 A | 4/1993 | Arego et al. |
| 5,207,492 A | 5/1993 | Roberts |
| 5,210,967 A | 5/1993 | Brown |
| 5,212,819 A | 5/1993 | Wada |
| 5,214,408 A | 5/1993 | Asayama |
| 5,217,794 A | 6/1993 | Schrenk |
| 5,223,814 A | 6/1993 | Suman |
| 5,223,844 A | 6/1993 | Mansell et al. |
| 5,229,975 A | 7/1993 | Truesdell et al. |
| 5,230,400 A | 7/1993 | Kakinama et al. |
| 5,233,461 A | 8/1993 | Dornan et al. |
| 5,235,316 A | 8/1993 | Qualizza |
| 5,239,405 A | 8/1993 | Varaprasad et al. |
| 5,239,406 A | 8/1993 | Lynam |
| 5,243,417 A | 9/1993 | Pollard |
| 5,245,422 A | 9/1993 | Borcherts et al. |
| 5,252,354 A | 10/1993 | Cronin et al. |
| 5,253,109 A | 10/1993 | O'Farrell et al. |
| 5,255,442 A | 10/1993 | Schierbeek et al. |
| 5,260,626 A | 11/1993 | Takase et al. |
| 5,277,986 A | 1/1994 | Cronin et al. |
| 5,280,555 A | 1/1994 | Ainsburg |
| 5,285,060 A | 2/1994 | Larson et al. |
| 5,289,321 A | 2/1994 | Secor |
| 5,296,924 A | 3/1994 | de Saint Blancard et al. |
| 5,303,075 A | 4/1994 | Wada et al. |
| 5,303,205 A | 4/1994 | Gauthier et al. |
| 5,304,980 A | 4/1994 | Maekawa |
| 5,305,012 A | 4/1994 | Faris |
| 5,307,136 A | 4/1994 | Saneyoshi |
| 5,313,335 A | 5/1994 | Gray et al. |
| 5,325,096 A | 6/1994 | Pakett |
| 5,325,386 A | 6/1994 | Jewell et al. |
| 5,327,288 A | 7/1994 | Wellington et al. |
| 5,330,149 A | 7/1994 | Haan et al. |
| 5,331,312 A | 7/1994 | Kudoh |
| 5,331,358 A | 7/1994 | Schurle et al. |

| Patent No. | | Date | Inventor | Patent No. | | Date | Inventor |
|---|---|---|---|---|---|---|---|
| 5,339,075 | A | 8/1994 | Abst et al. | 5,566,224 | A | 10/1996 | ul Azam et al. |
| 5,339,529 | A | 8/1994 | Lindberg | 5,567,360 | A | 10/1996 | Varaprasad et al. |
| 5,341,437 | A | 8/1994 | Nakayama | 5,568,316 | A | 10/1996 | Schrenck et al. |
| D351,370 | S | 10/1994 | Lawlor et al. | 5,570,127 | A | 10/1996 | Schmidt |
| 5,354,965 | A | 10/1994 | Lee | 5,572,354 | A | 11/1996 | Desmond et al. |
| 5,355,118 | A | 10/1994 | Fukuhara | 5,574,426 | A | 11/1996 | Shisgal et al. |
| 5,355,245 | A | 10/1994 | Lynam | 5,574,443 | A | 11/1996 | Hsieh |
| 5,355,284 | A | 10/1994 | Roberts | 5,575,552 | A | 11/1996 | Faloon et al. |
| 5,361,190 | A | 11/1994 | Roberts et al. | 5,576,687 | A | 11/1996 | Blank et al. |
| 5,363,294 | A | 11/1994 | Yamamoto et al. | 5,576,854 | A | 11/1996 | Schmidt et al. |
| 5,371,659 | A | 12/1994 | Pastrick et al. | 5,576,975 | A | 11/1996 | Sasaki et al. |
| 5,373,482 | A | 12/1994 | Gauthier | 5,578,404 | A | 11/1996 | Kliem |
| 5,379,146 | A | 1/1995 | Defendini | 5,587,236 | A | 12/1996 | Agrawal et al. |
| 5,386,285 | A | 1/1995 | Asayama | 5,587,699 | A | 12/1996 | Faloon et al. |
| 5,386,306 | A | 1/1995 | Gunjima et al. | 5,593,221 | A | 1/1997 | Evanicky et al. |
| 5,400,158 | A | 3/1995 | Ohnishi et al. | 5,594,222 | A | 1/1997 | Caldwell |
| 5,402,103 | A | 3/1995 | Tashiro | 5,594,560 | A | 1/1997 | Jelley et al. |
| 5,406,395 | A | 4/1995 | Wilson et al. | 5,594,615 | A | 1/1997 | Spijkerman et al. |
| 5,406,414 | A | 4/1995 | O'Farrell et al. | 5,602,542 | A | 2/1997 | Widmann et al. |
| 5,408,353 | A | 4/1995 | Nichols et al. | 5,602,670 | A | 2/1997 | Keegan |
| 5,408,357 | A | 4/1995 | Beukema | 5,608,550 | A | 3/1997 | Epstein et al. |
| 5,410,346 | A | 4/1995 | Saneyoshi et al. | 5,609,652 | A | 3/1997 | Yamada et al. |
| 5,414,439 | A | 5/1995 | Groves et al. | 5,610,380 | A | 3/1997 | Nicolaisen |
| 5,414,461 | A | 5/1995 | Kishi et al. | 5,610,756 | A | 3/1997 | Lynam et al. |
| 5,416,313 | A | 5/1995 | Larson et al. | 5,611,966 | A | 3/1997 | Varaprasad et al. |
| 5,416,478 | A | 5/1995 | Morinaga | 5,614,885 | A | 3/1997 | Van Lente et al. |
| 5,418,610 | A | 5/1995 | Fischer | 5,615,023 | A | 3/1997 | Yang |
| 5,422,756 | A | 6/1995 | Weber | 5,615,857 | A | 4/1997 | Hook |
| 5,424,726 | A | 6/1995 | Beymer | 5,617,085 | A | 4/1997 | Tsutsumi et al. |
| 5,424,865 | A | 6/1995 | Lynam | 5,619,374 | A | 4/1997 | Roberts |
| 5,424,952 | A | 6/1995 | Asayama | 5,619,375 | A | 4/1997 | Roberts |
| 5,426,524 | A | 6/1995 | Wada et al. | 5,626,800 | A | 5/1997 | Williams et al. |
| 5,430,431 | A | 7/1995 | Nelson | 5,631,089 | A | 5/1997 | Center, Jr. et al. |
| 5,432,496 | A | 7/1995 | Lin | 5,631,638 | A | 5/1997 | Kaspar et al. |
| 5,432,626 | A | 7/1995 | Sasuga et al. | 5,631,639 | A | 5/1997 | Hibino et al. |
| 5,436,741 | A | 7/1995 | Crandall | 5,632,092 | A | 5/1997 | Blank et al. |
| 5,437,931 | A | 8/1995 | Tsai et al. | 5,632,551 | A | 5/1997 | Roney et al. |
| 5,439,305 | A | 8/1995 | Santo | 5,634,709 | A | 6/1997 | Iwama |
| 5,444,478 | A | 8/1995 | Lelong et al. | 5,640,216 | A | 6/1997 | Hasegawa et al. |
| 5,446,576 | A | 8/1995 | Lynam et al. | 5,642,238 | A | 6/1997 | Sala |
| 5,455,716 | A | 10/1995 | Suman et al. | 5,644,851 | A | 7/1997 | Blank et al. |
| 5,461,361 | A | 10/1995 | Moore | 5,646,614 | A | 7/1997 | Abersfelder et al. |
| D363,920 | S | 11/1995 | Roberts et al. | 5,649,756 | A | 7/1997 | Adams et al. |
| 5,469,298 | A | 11/1995 | Suman et al. | 5,649,758 | A | 7/1997 | Dion |
| 5,475,366 | A | 12/1995 | Van Lente et al. | 5,650,765 | A | 7/1997 | Park |
| 5,475,494 | A | 12/1995 | Nishida et al. | 5,650,929 | A | 7/1997 | Potter et al. |
| 5,481,409 | A | 1/1996 | Roberts | 5,661,455 | A | 8/1997 | Van Lente et al. |
| 5,483,453 | A | 1/1996 | Uemura et al. | 5,661,651 | A | 8/1997 | Geschke et al. |
| 5,485,161 | A | 1/1996 | Vaughn | 5,661,804 | A | 8/1997 | Dykema et al. |
| 5,485,378 | A | 1/1996 | Franke et al. | 5,662,375 | A | 9/1997 | Adams et al. |
| 5,487,522 | A | 1/1996 | Hook | 5,666,157 | A | 9/1997 | Aviv |
| 5,488,496 | A | 1/1996 | Pine | 5,667,289 | A | 9/1997 | Akahane et al. |
| 5,497,305 | A | 3/1996 | Pastrick et al. | 5,668,663 | A | 9/1997 | Varaprasad et al. |
| 5,497,306 | A | 3/1996 | Pastrick | 5,668,675 | A | 9/1997 | Fredricks |
| 5,500,760 | A | 3/1996 | Varaprasad et al. | 5,669,698 | A | 9/1997 | Veldman et al. |
| 5,506,701 | A | 4/1996 | Ichikawa | 5,669,699 | A | 9/1997 | Pastrick et al. |
| 5,509,606 | A | 4/1996 | Breithaupt et al. | 5,669,704 | A | 9/1997 | Pastrick |
| 5,510,983 | A | 4/1996 | Iino | 5,669,705 | A | 9/1997 | Pastrick et al. |
| 5,515,448 | A | 5/1996 | Nishitani | 5,670,935 | A | 9/1997 | Schofield et al. |
| 5,519,621 | A | 5/1996 | Wortham | 5,671,996 | A | 9/1997 | Bos et al. |
| 5,521,744 | A | 5/1996 | Mazurek | 5,673,994 | A | 10/1997 | Fant, Jr. et al. |
| 5,521,760 | A | 5/1996 | DeYoung et al. | 5,673,999 | A | 10/1997 | Koenck |
| 5,523,811 | A | 6/1996 | Wada et al. | 5,677,598 | A | 10/1997 | De Hair et al. |
| 5,523,877 | A | 6/1996 | Lynam | 5,679,283 | A | 10/1997 | Tonar et al. |
| 5,525,264 | A | 6/1996 | Cronin et al. | 5,680,123 | A | 10/1997 | Lee |
| 5,525,977 | A | 6/1996 | Suman | 5,680,245 | A | 10/1997 | Lynam |
| 5,528,422 | A | 6/1996 | Roberts | 5,680,263 | A | 10/1997 | Zimmermann et al. |
| 5,528,474 | A | 6/1996 | Roney et al. | 5,686,975 | A | 11/1997 | Lipton |
| 5,529,138 | A | 6/1996 | Shaw et al. | 5,686,979 | A | 11/1997 | Weber et al. |
| 5,530,240 | A | 6/1996 | Larson et al. | 5,689,241 | A | 11/1997 | Clark, Sr. et al. |
| 5,530,420 | A | 6/1996 | Tsuchiya et al. | 5,689,370 | A | 11/1997 | Tonar et al. |
| 5,530,421 | A | 6/1996 | Marshall et al. | 5,691,848 | A | 11/1997 | Van Lente et al. |
| 5,535,056 | A | 7/1996 | Caskey et al. | 5,692,819 | A | 12/1997 | Mitsutake et al. |
| 5,535,144 | A | 7/1996 | Kise | 5,696,529 | A | 12/1997 | Evanicky et al. |
| 5,539,397 | A | 7/1996 | Asanuma et al. | 5,696,567 | A | 12/1997 | Wada et al. |
| 5,541,590 | A | 7/1996 | Nishio | 5,699,044 | A | 12/1997 | Van Lente et al. |
| 5,550,677 | A | 8/1996 | Schofield et al. | 5,699,188 | A | 12/1997 | Gilbert et al. |
| 5,555,172 | A | 9/1996 | Potter | 5,703,568 | A | 12/1997 | Hegyi |
| 5,561,333 | A | 10/1996 | Darius | 5,708,410 | A | 1/1998 | Blank et al. |

| | | | | | |
|---|---|---|---|---|---|
| 5,708,415 A | 1/1998 | Van Lente et al. | 5,879,074 A | 3/1999 | Pastrick |
| 5,708,857 A | 1/1998 | Ishibashi | 5,883,605 A | 3/1999 | Knapp |
| 5,715,093 A | 2/1998 | Schierbeek et al. | 5,883,739 A | 3/1999 | Ashihara et al. |
| 5,724,187 A | 3/1998 | Varaprasad et al. | 5,888,431 A | 3/1999 | Tonar et al. |
| 5,724,316 A | 3/1998 | Brunts | 5,894,196 A | 4/1999 | McDermott |
| 5,729,194 A | 3/1998 | Spears et al. | D409,540 S | 5/1999 | Muth |
| 5,737,226 A | 4/1998 | Olson et al. | 5,899,551 A | 5/1999 | Neijzen et al. |
| 5,741,966 A | 4/1998 | Handfield et al. | 5,899,956 A | 5/1999 | Chan |
| 5,744,227 A | 4/1998 | Bright et al. | 5,904,729 A | 5/1999 | Ruzicka |
| 5,745,050 A | 4/1998 | Nakagawa | 5,910,854 A | 6/1999 | Varaprasad et al. |
| 5,745,266 A | 4/1998 | Smith | 5,914,815 A | 6/1999 | Bos |
| 5,748,172 A | 5/1998 | Song et al. | 5,917,664 A | 6/1999 | O'Neill et al. |
| 5,748,287 A | 5/1998 | Takahashi et al. | 5,918,180 A | 6/1999 | Dimino |
| 5,751,211 A | 5/1998 | Shirai et al. | 5,922,176 A | 7/1999 | Caskey |
| 5,751,246 A | 5/1998 | Hertel | 5,923,027 A | 7/1999 | Stam et al. |
| 5,751,390 A | 5/1998 | Crawford et al. | 5,923,457 A | 7/1999 | Byker et al. |
| 5,751,489 A | 5/1998 | Caskey et al. | 5,924,212 A | 7/1999 | Domanski |
| 5,754,099 A | 5/1998 | Nishimura et al. | 5,926,087 A | 7/1999 | Busch et al. |
| D394,833 S | 6/1998 | Muth | 5,927,792 A | 7/1999 | Welling et al. |
| 5,760,828 A | 6/1998 | Cortes | 5,928,572 A | 7/1999 | Tonar et al. |
| 5,760,931 A | 6/1998 | Saburi et al. | 5,929,786 A | 7/1999 | Schofield et al. |
| 5,760,962 A | 6/1998 | Schofield et al. | 5,931,555 A | 8/1999 | Akahane et al. |
| 5,761,094 A | 6/1998 | Olson et al. | 5,935,702 A | 8/1999 | Macquart et al. |
| 5,762,823 A | 6/1998 | Hikmet | 5,938,320 A | 8/1999 | Crandall |
| 5,764,139 A | 6/1998 | Nojima et al. | 5,938,321 A | 8/1999 | Bos et al. |
| 5,765,940 A | 6/1998 | Levy et al. | 5,938,721 A | 8/1999 | Dussell et al. |
| 5,767,793 A | 6/1998 | Agravante et al. | 5,940,011 A | 8/1999 | Agravante et al. |
| 5,768,020 A | 6/1998 | Nagao | 5,940,120 A | 8/1999 | Frankhouse et al. |
| 5,775,762 A | 7/1998 | Vitito | 5,940,201 A | 8/1999 | Ash et al. |
| 5,777,779 A | 7/1998 | Hashimoto et al. | 5,942,895 A | 8/1999 | Popovic et al. |
| 5,780,160 A | 7/1998 | Allemand et al. | 5,947,586 A | 9/1999 | Weber |
| 5,786,772 A | 7/1998 | Schofield et al. | 5,949,331 A | 9/1999 | Schofield et al. |
| 5,788,357 A | 8/1998 | Muth et al. | 5,956,079 A | 9/1999 | Ridgley |
| 5,790,298 A | 8/1998 | Tonar | 5,956,181 A | 9/1999 | Lin |
| 5,790,502 A | 8/1998 | Horinouchi et al. | 5,959,367 A | 9/1999 | O'Farrell et al. |
| 5,790,973 A | 8/1998 | Blaker et al. | 5,959,555 A | 9/1999 | Furuta |
| 5,793,308 A | 8/1998 | Rosinski et al. | 5,959,577 A | 9/1999 | Fan et al. |
| 5,793,420 A | 8/1998 | Schmidt | 5,963,247 A | 10/1999 | Banitt |
| 5,796,094 A | 8/1998 | Schofield et al. | 5,965,247 A | 10/1999 | Jonza et al. |
| 5,796,176 A | 8/1998 | Kramer et al. | 5,968,538 A | 10/1999 | Snyder, Jr. |
| 5,798,057 A | 8/1998 | Hikmet | 5,971,552 A | 10/1999 | O'Farrell et al. |
| 5,798,575 A | 8/1998 | O'Farrell et al. | 5,973,760 A | 10/1999 | Dehmlow |
| 5,798,688 A | 8/1998 | Schofield | 5,975,715 A | 11/1999 | Bauder |
| 5,800,918 A | 9/1998 | Chartier et al. | 5,984,482 A | 11/1999 | Rumsey et al. |
| 5,802,727 A | 9/1998 | Blank et al. | 5,986,730 A | 11/1999 | Hansen et al. |
| 5,803,579 A | 9/1998 | Turnbull et al. | 5,990,469 A | 11/1999 | Bechtel et al. |
| 5,805,330 A | 9/1998 | Byker et al. | 5,990,625 A | 11/1999 | Meissner et al. |
| 5,805,367 A | 9/1998 | Kanazawa | 5,995,180 A | 11/1999 | Moriwaki et al. |
| 5,806,879 A | 9/1998 | Hamada et al. | 5,998,617 A | 12/1999 | Srinivasa et al. |
| 5,806,965 A | 9/1998 | Deese | 5,998,929 A | 12/1999 | Bechtel et al. |
| 5,808,197 A | 9/1998 | Dao | 6,000,823 A | 12/1999 | Desmond et al. |
| 5,808,566 A | 9/1998 | Behr et al. | 6,001,486 A | 12/1999 | Varaprasad et al. |
| 5,808,589 A | 9/1998 | Fergason | 6,002,511 A | 12/1999 | Varaprasad et al. |
| 5,808,713 A | 9/1998 | Broer et al. | 6,002,544 A | 12/1999 | Yatsu |
| 5,808,777 A | 9/1998 | Lynam et al. | 6,002,983 A | 12/1999 | Alland et al. |
| 5,808,778 A | 9/1998 | Bauer et al. | 6,005,724 A | 12/1999 | Todd |
| 5,812,321 A | 9/1998 | Schierbeek et al. | 6,007,222 A | 12/1999 | Thau |
| 5,813,745 A | 9/1998 | Fant, Jr. et al. | 6,008,486 A | 12/1999 | Stam et al. |
| 5,818,625 A | 10/1998 | Forgette et al. | 6,008,871 A | 12/1999 | Okumura |
| 5,820,097 A | 10/1998 | Spooner | 6,009,359 A | 12/1999 | El-Hakim et al. |
| 5,820,245 A | 10/1998 | Desmond et al. | 6,016,035 A | 1/2000 | Eberspächer et al. |
| 5,822,023 A | 10/1998 | Suman et al. | 6,016,215 A | 1/2000 | Byker |
| 5,823,654 A | 10/1998 | Pastrick et al. | 6,019,411 A | 2/2000 | Carter et al. |
| 5,825,527 A | 10/1998 | Forgette et al. | 6,019,475 A | 2/2000 | Lynam et al. |
| 5,835,166 A | 11/1998 | Hall et al. | 6,020,987 A | 2/2000 | Baumann et al. |
| 5,837,994 A | 11/1998 | Stam et al. | 6,021,371 A | 2/2000 | Fultz |
| 5,844,505 A | 12/1998 | Van Ryzin | 6,023,229 A | 2/2000 | Bugno et al. |
| 5,848,373 A | 12/1998 | DeLorme et al. | 6,025,872 A | 2/2000 | Ozaki et al. |
| 5,850,176 A | 12/1998 | Kinoshita et al. | 6,028,537 A | 2/2000 | Suman et al. |
| 5,850,205 A | 12/1998 | Blouin | 6,037,689 A | 3/2000 | Bingle et al. |
| 5,863,116 A | 1/1999 | Pastrick et al. | 6,040,939 A | 3/2000 | Demiryont et al. |
| 5,864,419 A | 1/1999 | Lynam | 6,042,253 A | 3/2000 | Fant, Jr. et al. |
| 5,867,801 A | 2/1999 | Denny | 6,042,934 A | 3/2000 | Guiselin et al. |
| 5,871,275 A | 2/1999 | O'Farrell et al. | 6,045,243 A | 4/2000 | Muth et al. |
| 5,871,843 A | 2/1999 | Yoneda et al. | 6,045,643 A | 4/2000 | Byker et al. |
| 5,877,707 A | 3/1999 | Kowalick | 6,046,766 A | 4/2000 | Sakata |
| 5,877,897 A | 3/1999 | Schofield et al. | 6,046,837 A | 4/2000 | Yamamoto |
| 5,878,353 A | 3/1999 | ul Azam et al. | 6,049,171 A | 4/2000 | Stam et al. |
| 5,878,370 A | 3/1999 | Olson | D425,466 S | 5/2000 | Todd et al. |

| | | | | | | |
|---|---|---|---|---|---|---|
| 6,060,989 | A | 5/2000 | Gehlot | 6,161,865 | A | 12/2000 | Rose et al. |
| 6,061,002 | A | 5/2000 | Weber et al. | 6,164,564 | A | 12/2000 | Franco et al. |
| 6,062,920 | A | 5/2000 | Jordan et al. | 6,166,625 | A | 12/2000 | Teowee et al. |
| 6,064,508 | A | 5/2000 | Forgette et al. | 6,166,629 | A | 12/2000 | Hamma et al. |
| 6,065,840 | A | 5/2000 | Caskey et al. | 6,166,834 | A | 12/2000 | Taketomi et al. |
| 6,066,920 | A | 5/2000 | Torihara et al. | 6,166,847 | A | 12/2000 | Tench et al. |
| 6,067,111 | A | 5/2000 | Hahn et al. | 6,166,848 | A | 12/2000 | Cammenga et al. |
| 6,067,500 | A | 5/2000 | Morimoto et al. | 6,167,255 | A | 12/2000 | Kennedy, III et al. |
| 6,068,380 | A | 5/2000 | Lynn et al. | 6,167,755 | B1 | 1/2001 | Damson et al. |
| D426,506 | S | 6/2000 | Todd et al. | 6,169,955 | B1 | 1/2001 | Fultz |
| D426,507 | S | 6/2000 | Todd et al. | 6,170,956 | B1 | 1/2001 | Rumsey et al. |
| D427,128 | S | 6/2000 | Mathieu | 6,172,600 | B1 | 1/2001 | Kakinama et al. |
| 6,072,391 | A | 6/2000 | Suzukie et al. | 6,172,601 | B1 | 1/2001 | Wada et al. |
| 6,074,077 | A | 6/2000 | Pastrick et al. | 6,172,613 | B1 | 1/2001 | DeLine et al. |
| 6,074,777 | A | 6/2000 | Reimers et al. | 6,173,501 | B1 | 1/2001 | Blank et al. |
| 6,076,948 | A | 6/2000 | Bukosky et al. | 6,175,164 | B1 | 1/2001 | O'Farrell et al. |
| 6,078,355 | A | 6/2000 | Zengel | 6,175,300 | B1 | 1/2001 | Kendrick |
| 6,078,865 | A | 6/2000 | Koyanagi | 6,176,602 | B1 | 1/2001 | Pastrick et al. |
| D428,372 | S | 7/2000 | Todd et al. | 6,178,034 | B1 | 1/2001 | Allemand et al. |
| D428,373 | S | 7/2000 | Todd et al. | 6,178,377 | B1 | 1/2001 | Ishihara et al. |
| 6,082,881 | A | 7/2000 | Hicks | 6,181,387 | B1 | 1/2001 | Rosen |
| 6,084,700 | A | 7/2000 | Knapp et al. | 6,182,006 | B1 | 1/2001 | Meek |
| 6,086,131 | A | 7/2000 | Bingle et al. | 6,183,119 | B1 | 2/2001 | Desmond et al. |
| 6,086,229 | A | 7/2000 | Pastrick | 6,184,679 | B1 | 2/2001 | Popovic et al. |
| 6,087,012 | A | 7/2000 | Varaprasad et al. | 6,184,781 | B1 | 2/2001 | Ramakesavan |
| 6,087,953 | A | 7/2000 | DeLine et al. | 6,185,492 | B1 | 2/2001 | Kagawa et al. |
| 6,091,343 | A | 7/2000 | Dykema et al. | 6,185,501 | B1 | 2/2001 | Smith et al. |
| 6,093,976 | A | 7/2000 | Kramer et al. | 6,188,505 | B1 | 2/2001 | Lomprey et al. |
| 6,094,618 | A | 7/2000 | Harada | 6,191,704 | B1 | 2/2001 | Takenaga et al. |
| D428,842 | S | 8/2000 | Todd et al. | 6,193,912 | B1 | 2/2001 | Thieste et al. |
| D429,202 | S | 8/2000 | Todd et al. | 6,195,194 | B1 | 2/2001 | Roberts et al. |
| D430,088 | S | 8/2000 | Todd et al. | 6,196,688 | B1 | 3/2001 | Caskey et al. |
| 6,097,023 | A | 8/2000 | Schofield et al. | 6,198,409 | B1 | 3/2001 | Schofield et al. |
| 6,097,316 | A | 8/2000 | Liaw et al. | 6,199,014 | B1 | 3/2001 | Walker et al. |
| 6,099,131 | A | 8/2000 | Fletcher et al. | 6,199,810 | B1 | 3/2001 | Wu et al. |
| 6,099,155 | A | 8/2000 | Pastrick et al. | 6,200,010 | B1 | 3/2001 | Anders |
| 6,102,546 | A | 8/2000 | Carter | 6,201,642 | B1 | 3/2001 | Bos |
| 6,102,559 | A | 8/2000 | Nold et al. | 6,206,553 | B1 | 3/2001 | Boddy et al. |
| 6,104,552 | A | 8/2000 | Thau et al. | 6,207,083 | B1 | 3/2001 | Varaprasad et al. |
| 6,106,121 | A | 8/2000 | Buckley et al. | 6,210,008 | B1 | 4/2001 | Hoekstra et al. |
| 6,111,498 | A | 8/2000 | Jobes et al. | 6,210,012 | B1 | 4/2001 | Broer |
| 6,111,683 | A | 8/2000 | Cammenga et al. | 6,212,470 | B1 | 4/2001 | Seymour et al. |
| 6,111,684 | A | 8/2000 | Forgette et al. | 6,217,181 | B1 | 4/2001 | Lynam et al. |
| 6,111,685 | A | 8/2000 | Tench et al. | 6,218,934 | B1 | 4/2001 | Regan |
| 6,111,696 | A | 8/2000 | Allen et al. | 6,222,447 | B1 | 4/2001 | Schofield et al. |
| 6,115,086 | A | 9/2000 | Rosen | 6,222,460 | B1 | 4/2001 | DeLine et al. |
| 6,115,651 | A | 9/2000 | Cruz | 6,222,689 | B1 | 4/2001 | Higuchi et al. |
| 6,116,743 | A | 9/2000 | Hoek | 6,227,689 | B1 | 5/2001 | Miller |
| 6,118,219 | A | 9/2000 | Okigami et al. | 6,232,937 | B1 | 5/2001 | Jacobsen et al. |
| 6,122,597 | A | 9/2000 | Saneyoshi et al. | 6,236,514 | B1 | 5/2001 | Sato |
| 6,122,921 | A | 9/2000 | Brezoczky et al. | 6,239,851 | B1 | 5/2001 | Hatazawa et al. |
| 6,124,647 | A | 9/2000 | Marcus et al. | 6,239,898 | B1 | 5/2001 | Byker et al. |
| 6,124,886 | A | 9/2000 | DeLine et al. | 6,239,899 | B1 | 5/2001 | DeVries et al. |
| 6,127,919 | A | 10/2000 | Wylin | 6,243,003 | B1 | 6/2001 | DeLine et al. |
| 6,127,945 | A | 10/2000 | Mura-Smith | 6,244,716 | B1 | 6/2001 | Steenwyk et al. |
| 6,128,576 | A | 10/2000 | Nishimoto et al. | 6,245,262 | B1 | 6/2001 | Varaprasad et al. |
| 6,130,421 | A | 10/2000 | Bechtel et al. | 6,247,820 | B1 | 6/2001 | Van Order |
| 6,130,448 | A | 10/2000 | Bauer et al. | 6,249,214 | B1 | 6/2001 | Kashiwazaki |
| 6,132,072 | A | 10/2000 | Turnbull et al. | 6,249,310 | B1 | 6/2001 | Lefkowitz |
| 6,137,620 | A | 10/2000 | Guarr et al. | 6,249,369 | B1 | 6/2001 | Theiste et al. |
| 6,139,171 | A | 10/2000 | Waldmann | 6,250,148 | B1 | 6/2001 | Lynam |
| 6,139,172 | A | 10/2000 | Bos et al. | 6,250,766 | B1 | 6/2001 | Strumolo et al. |
| 6,140,933 | A | 10/2000 | Bugno et al. | 6,250,783 | B1 | 6/2001 | Stidham et al. |
| 6,142,656 | A | 11/2000 | Kurth | 6,255,639 | B1 | 7/2001 | Stam et al. |
| 6,146,003 | A | 11/2000 | Thau | 6,257,746 | B1 | 7/2001 | Todd et al. |
| 6,147,934 | A | 11/2000 | Arikawa et al. | 6,259,412 | B1 | 7/2001 | Duroux |
| 6,148,261 | A | 11/2000 | Obradovich et al. | 6,259,475 | B1 | 7/2001 | Ramachandran et al. |
| 6,149,287 | A | 11/2000 | Pastrick et al. | 6,260,608 | B1 | 7/2001 | Kim |
| 6,150,014 | A | 11/2000 | Chu et al. | 6,262,842 | B1 | 7/2001 | Ouderkirk et al. |
| 6,151,065 | A | 11/2000 | Steed et al. | 6,264,353 | B1 | 7/2001 | Caraher et al. |
| 6,151,539 | A | 11/2000 | Bergholz et al. | 6,265,968 | B1 | 7/2001 | Betzitza et al. |
| 6,152,551 | A | 11/2000 | Annas | 6,268,803 | B1 | 7/2001 | Gunderson et al. |
| 6,152,590 | A | 11/2000 | Fürst et al. | 6,268,837 | B1 | 7/2001 | Kobayashi et al. |
| 6,154,149 | A | 11/2000 | Tyckowski et al. | 6,269,308 | B1 | 7/2001 | Kodaka et al. |
| 6,154,306 | A | 11/2000 | Varaprasad et al. | 6,271,901 | B1 | 8/2001 | Ide et al. |
| 6,157,294 | A | 12/2000 | Urai et al. | 6,274,221 | B2 | 8/2001 | Smith et al. |
| 6,157,418 | A | 12/2000 | Rosen | 6,276,821 | B1 | 8/2001 | Pastrick et al. |
| 6,157,480 | A | 12/2000 | Anderson et al. | 6,276,822 | B1 | 8/2001 | Bedrosian et al. |
| 6,158,655 | A | 12/2000 | DeVries, Jr. et al. | 6,277,471 | B1 | 8/2001 | Tang |

| | | |
|---|---|---|
| 6,278,271 B1 | 8/2001 | Schott |
| 6,278,377 B1 | 8/2001 | DeLine et al. |
| 6,278,941 B1 | 8/2001 | Yokoyama |
| 6,280,068 B1 | 8/2001 | Mertens et al. |
| 6,280,069 B1 | 8/2001 | Pastrick et al. |
| 6,281,804 B1 | 8/2001 | Haller et al. |
| 6,286,965 B1 | 9/2001 | Caskey et al. |
| 6,286,984 B1 | 9/2001 | Berg |
| 6,289,332 B2 | 9/2001 | Menig et al. |
| 6,290,378 B1 | 9/2001 | Buchalla et al. |
| 6,291,905 B1 | 9/2001 | Drummond et al. |
| 6,291,906 B1 | 9/2001 | Marcus et al. |
| 6,294,989 B1 | 9/2001 | Schofield et al. |
| 6,296,379 B1 | 10/2001 | Pastrick |
| 6,297,781 B1 | 10/2001 | Turnbull et al. |
| 6,299,333 B1 | 10/2001 | Pastrick et al. |
| 6,300,879 B1 | 10/2001 | Regan et al. |
| 6,301,039 B1 | 10/2001 | Tench |
| 6,304,173 B2 | 10/2001 | Pala et al. |
| 6,305,807 B1 | 10/2001 | Schierbeek |
| 6,310,611 B1 | 10/2001 | Caldwell |
| 6,310,714 B1 | 10/2001 | Lomprey et al. |
| 6,310,738 B1 | 10/2001 | Chu |
| 6,313,454 B1 | 11/2001 | Bos et al. |
| 6,314,295 B1 | 11/2001 | Kawamoto |
| 6,315,440 B1 | 11/2001 | Satoh |
| 6,317,057 B1 | 11/2001 | Lee |
| 6,317,180 B1 | 11/2001 | Kuroiwa et al. |
| 6,317,248 B1 | 11/2001 | Agrawal et al. |
| 6,318,870 B1 | 11/2001 | Spooner et al. |
| 6,320,176 B1 | 11/2001 | Schofield et al. |
| 6,320,282 B1 | 11/2001 | Caldwell |
| 6,320,612 B1 | 11/2001 | Young |
| 6,324,295 B1 | 11/2001 | Valery et al. |
| 6,326,613 B1 | 12/2001 | Heslin et al. |
| 6,326,900 B2 | 12/2001 | DeLine et al. |
| 6,329,925 B1 | 12/2001 | Skiver et al. |
| 6,330,511 B2 | 12/2001 | Ogura et al. |
| 6,331,066 B1 | 12/2001 | Desmond et al. |
| 6,333,759 B1 | 12/2001 | Mazzilli |
| 6,335,680 B1 | 1/2002 | Matsuoka |
| 6,336,737 B1 | 1/2002 | Thau |
| 6,340,850 B2 | 1/2002 | O'Farrell et al. |
| 6,341,523 B2 | 1/2002 | Lynam |
| 6,344,805 B1 | 2/2002 | Yasui et al. |
| 6,346,698 B1 | 2/2002 | Turnbull |
| 6,347,880 B1 | 2/2002 | Fürst et al. |
| 6,348,858 B2 | 2/2002 | Weis et al. |
| 6,351,708 B1 | 2/2002 | Takagi et al. |
| 6,353,392 B1 | 3/2002 | Schofield et al. |
| 6,356,206 B1 | 3/2002 | Takenaga et al. |
| 6,356,376 B1 | 3/2002 | Tonar et al. |
| 6,356,389 B1 | 3/2002 | Nilsen et al. |
| 6,357,883 B1 | 3/2002 | Strumolo et al. |
| 6,362,121 B1 | 3/2002 | Chopin et al. |
| 6,362,548 B1 | 3/2002 | Bingle et al. |
| 6,363,326 B1 | 3/2002 | Scully |
| 6,366,013 B1 | 4/2002 | Leenders et al. |
| 6,366,213 B2 | 4/2002 | DeLine et al. |
| 6,370,329 B1 | 4/2002 | Teuchert |
| 6,371,636 B1 | 4/2002 | Wesson |
| 6,379,013 B1 | 4/2002 | Bechtel et al. |
| 6,379,788 B2 | 4/2002 | Choi et al. |
| 6,382,805 B1 | 5/2002 | Miyabukuro |
| 6,385,139 B1 | 5/2002 | Arikawa et al. |
| 6,386,742 B1 | 5/2002 | DeLine et al. |
| 6,390,529 B1 | 5/2002 | Bingle et al. |
| 6,390,626 B2 | 5/2002 | Knox |
| 6,390,635 B2 | 5/2002 | Whitehead et al. |
| 6,396,397 B1 | 5/2002 | Bos et al. |
| 6,396,408 B2 | 5/2002 | Drummond et al. |
| 6,396,637 B2 | 5/2002 | Roest et al. |
| 6,407,468 B1 | 6/2002 | LeVesque et al. |
| 6,407,847 B1 | 6/2002 | Poll et al. |
| 6,408,247 B1 | 6/2002 | Ichikawa et al. |
| 6,411,204 B1 | 6/2002 | Bloomfield et al. |
| 6,412,959 B1 | 7/2002 | Tseng |
| 6,412,973 B1 | 7/2002 | Bos et al. |
| 6,414,910 B1 | 7/2002 | Kaneko et al. |
| 6,415,230 B1 | 7/2002 | Maruko et al. |
| 6,416,208 B2 | 7/2002 | Pastrick et al. |
| 6,417,786 B2 | 7/2002 | Learman et al. |
| 6,418,376 B1 | 7/2002 | Olson |
| 6,419,300 B1 | 7/2002 | Pavao et al. |
| 6,420,036 B1 | 7/2002 | Varaprasad et al. |
| 6,420,800 B1 | 7/2002 | LeVesque et al. |
| 6,420,975 B1 | 7/2002 | DeLine et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,892 B1 | 7/2002 | Matsuoka |
| 6,426,492 B1 | 7/2002 | Bos et al. |
| 6,426,568 B2 | 7/2002 | Turnbull et al. |
| 6,427,349 B1 | 8/2002 | Blank et al. |
| 6,428,172 B1 | 8/2002 | Hutzel et al. |
| 6,433,676 B2 | 8/2002 | DeLine et al. |
| 6,433,680 B1 | 8/2002 | Ho |
| 6,433,914 B1 | 8/2002 | Lomprey et al. |
| 6,437,688 B1 | 8/2002 | Kobayashi |
| 6,438,491 B1 | 8/2002 | Farmer |
| 6,439,755 B1 | 8/2002 | Fant, Jr. et al. |
| 6,441,872 B1 | 8/2002 | Ho |
| 6,441,943 B1 | 8/2002 | Roberts et al. |
| 6,441,963 B2 | 8/2002 | Murakami et al. |
| 6,441,964 B1 | 8/2002 | Chu et al. |
| 6,445,287 B1 | 9/2002 | Schofield et al. |
| 6,447,128 B1 | 9/2002 | Lang et al. |
| 6,449,082 B1 | 9/2002 | Agrawal et al. |
| 6,452,533 B1 | 9/2002 | Yamabuchi et al. |
| 6,462,795 B1 | 10/2002 | Clarke |
| 6,463,369 B2 | 10/2002 | Sadano et al. |
| 6,466,701 B1 | 10/2002 | Ejiri et al. |
| 6,471,362 B1 | 10/2002 | Carter et al. |
| 6,472,977 B1 | 10/2002 | Pöchmüller |
| 6,472,979 B2 | 10/2002 | Schofield et al. |
| 6,473,001 B1 | 10/2002 | Blum |
| 6,474,853 B2 | 11/2002 | Pastrick et al. |
| 6,476,731 B1 | 11/2002 | Miki et al. |
| 6,477,460 B2 | 11/2002 | Kepler |
| 6,477,464 B2 | 11/2002 | McCarthy et al. |
| 6,483,429 B1 | 11/2002 | Yasui et al. |
| 6,483,438 B2 | 11/2002 | DeLine et al. |
| 6,483,613 B1 | 11/2002 | Woodgate et al. |
| 6,487,500 B2 | 11/2002 | Lemelson et al. |
| 6,494,602 B2 | 12/2002 | Pastrick et al. |
| 6,498,620 B2 | 12/2002 | Schofield et al. |
| 6,501,387 B2 | 12/2002 | Skiver et al. |
| 6,512,203 B2 | 1/2003 | Jones et al. |
| 6,512,624 B2 | 1/2003 | Tonar et al. |
| 6,513,252 B1 | 2/2003 | Schierbeek et al. |
| 6,515,581 B1 | 2/2003 | Ho |
| 6,515,582 B1 | 2/2003 | Teowee |
| 6,515,597 B1 | 2/2003 | Wada et al. |
| 6,516,664 B2 | 2/2003 | Lynam |
| 6,518,691 B1 | 2/2003 | Baba |
| 6,519,209 B1 | 2/2003 | Arikawa et al. |
| 6,520,667 B1 | 2/2003 | Mousseau |
| 6,522,451 B1 | 2/2003 | Lynam |
| 6,522,969 B2 | 2/2003 | Kannonji |
| 6,525,707 B1 | 2/2003 | Kaneko et al. |
| 6,534,884 B2 | 3/2003 | Marcus et al. |
| 6,538,709 B1 | 3/2003 | Kurihara et al. |
| 6,539,306 B2 | 3/2003 | Turnbull et al. |
| 6,542,085 B1 | 4/2003 | Yang |
| 6,542,182 B1 | 4/2003 | Chautorash |
| 6,543,163 B1 | 4/2003 | Ginsberg |
| 6,545,598 B1 | 4/2003 | de Villeroche |
| 6,549,253 B1 | 4/2003 | Robbie et al. |
| 6,549,335 B1 | 4/2003 | Trapani et al. |
| 6,550,949 B1 | 4/2003 | Bauer et al. |
| 6,552,326 B2 | 4/2003 | Turnbull |
| 6,553,308 B1 | 4/2003 | Uhlmann et al. |
| 6,559,902 B1 | 5/2003 | Kusuda et al. |
| 6,560,004 B2 | 5/2003 | Theiste et al. |
| 6,560,027 B2 | 5/2003 | Meine |
| 6,566,821 B2 | 5/2003 | Nakatsuka et al. |
| 6,567,060 B1 | 5/2003 | Sekiguchi |
| 6,567,708 B1 | 5/2003 | Bechtel et al. |

| | | |
|---|---|---|
| 6,568,839 B1 | 5/2003 | Pastrick et al. |
| 6,572,233 B1 | 6/2003 | Northman et al. |
| 6,573,957 B1 | 6/2003 | Suzuki |
| 6,573,963 B2 | 6/2003 | Ouderkirk et al. |
| 6,575,582 B2 | 6/2003 | Tenmyo |
| 6,575,643 B2 | 6/2003 | Takahashi |
| 6,578,989 B2 | 6/2003 | Osumi et al. |
| 6,580,373 B1 | 6/2003 | Ohashi |
| 6,580,479 B1 | 6/2003 | Sekiguchi et al. |
| 6,580,562 B2 | 6/2003 | Aoki et al. |
| 6,581,007 B2 | 6/2003 | Hasegawa et al. |
| 6,583,730 B2 | 6/2003 | Lang et al. |
| 6,591,192 B2 | 7/2003 | Okamura et al. |
| 6,592,230 B2 | 7/2003 | Dupay |
| 6,593,565 B2 | 7/2003 | Heslin et al. |
| 6,593,984 B2 | 7/2003 | Arakawa et al. |
| 6,594,065 B2 | 7/2003 | Byker et al. |
| 6,594,067 B2 | 7/2003 | Poll et al. |
| 6,594,090 B2 | 7/2003 | Kruschwitz et al. |
| 6,594,583 B2 | 7/2003 | Ogura et al. |
| 6,594,614 B2 | 7/2003 | Studt et al. |
| 6,595,649 B2 | 7/2003 | Hoekstra et al. |
| 6,597,489 B1 | 7/2003 | Guarr et al. |
| 6,606,183 B2 | 8/2003 | Ikai et al. |
| 6,611,202 B2 | 8/2003 | Schofield et al. |
| 6,611,227 B1 | 8/2003 | Nebiyeloul-Kifle et al. |
| 6,611,759 B2 | 8/2003 | Brosche |
| 6,614,387 B1 | 9/2003 | Deadman |
| 6,614,579 B2 | 9/2003 | Roberts et al. |
| 6,615,438 B1 | 9/2003 | Franco et al. |
| 6,616,313 B2 | 9/2003 | Fürst et al. |
| 6,616,764 B2 | 9/2003 | Krämer et al. |
| 6,618,672 B2 | 9/2003 | Sasaki et al. |
| 6,621,616 B1 | 9/2003 | Bauer et al. |
| 6,624,936 B2 | 9/2003 | Kotchick et al. |
| 6,627,918 B2 | 9/2003 | Getz et al. |
| 6,630,888 B2 | 10/2003 | Lang et al. |
| 6,636,190 B2 | 10/2003 | Hirakata et al. |
| 6,636,258 B2 | 10/2003 | Strumolo |
| 6,638,582 B1 | 10/2003 | Uchiyama et al. |
| 6,639,360 B2 | 10/2003 | Roberts et al. |
| 6,642,840 B2 | 11/2003 | Lang et al. |
| 6,642,851 B2 | 11/2003 | DeLine et al. |
| 6,646,697 B1 | 11/2003 | Sekiguchi et al. |
| 6,648,477 B2 | 11/2003 | Hutzel et al. |
| 6,650,457 B2 | 11/2003 | Busscher et al. |
| 6,657,607 B1 | 12/2003 | Evanicky et al. |
| 6,661,482 B2 | 12/2003 | Hara |
| 6,661,830 B1 | 12/2003 | Reed et al. |
| 6,665,592 B2 | 12/2003 | Kodama |
| 6,669,109 B2 | 12/2003 | Ivanov et al. |
| 6,669,285 B1 | 12/2003 | Park et al. |
| 6,670,207 B1 | 12/2003 | Roberts |
| 6,670,910 B2 | 12/2003 | Delcheccolo et al. |
| 6,670,941 B2 | 12/2003 | Albu et al. |
| 6,671,080 B2 | 12/2003 | Poll et al. |
| 6,672,731 B2 | 1/2004 | Schnell et al. |
| 6,672,734 B2 | 1/2004 | Lammers |
| 6,672,744 B2 | 1/2004 | DeLine et al. |
| 6,672,745 B1 | 1/2004 | Bauer et al. |
| 6,674,370 B2 | 1/2004 | Rodewald et al. |
| 6,675,075 B1 | 1/2004 | Engelsburg et al. |
| 6,678,083 B1 | 1/2004 | Anstee |
| 6,678,614 B2 | 1/2004 | McCarthy et al. |
| 6,679,608 B2 | 1/2004 | Bechtel et al. |
| 6,683,539 B2 | 1/2004 | Trajkovic et al. |
| 6,683,969 B1 | 1/2004 | Nishigaki et al. |
| 6,685,348 B2 | 2/2004 | Pastrick et al. |
| 6,690,262 B1 | 2/2004 | Winnett |
| 6,690,268 B2 | 2/2004 | Schofield et al. |
| 6,690,413 B1 | 2/2004 | Moore |
| 6,690,438 B2 | 2/2004 | Sekiguchi |
| 6,693,517 B2 | 2/2004 | McCarthy et al. |
| 6,693,518 B2 | 2/2004 | Kumata et al. |
| 6,693,519 B2 | 2/2004 | Keirstead |
| 6,693,524 B1 | 2/2004 | Payne |
| 6,700,692 B2 | 3/2004 | Tonar et al. |
| 6,709,136 B2 | 3/2004 | Pastrick et al. |
| 6,713,783 B1 | 3/2004 | Mase et al. |
| 6,717,109 B1 | 4/2004 | Macher et al. |
| 6,717,610 B1 | 4/2004 | Bos et al. |
| 6,717,712 B2 | 4/2004 | Lynam et al. |
| 6,719,215 B2 | 4/2004 | Droulliard |
| 6,724,446 B2 | 4/2004 | Motomura et al. |
| 6,726,337 B2 | 4/2004 | Whitehead et al. |
| 6,727,807 B2 | 4/2004 | Trajkovic et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,736,526 B2 | 5/2004 | Matsuba et al. |
| 6,737,629 B2 | 5/2004 | Nixon et al. |
| 6,737,630 B2 | 5/2004 | Turnbull |
| 6,737,964 B2 | 5/2004 | Samman et al. |
| 6,738,088 B1 | 5/2004 | Uskolovsky et al. |
| 6,742,904 B2 | 6/2004 | Bechtel et al. |
| 6,744,353 B2 | 6/2004 | Sjönell |
| 6,746,775 B1 | 6/2004 | Boire et al. |
| 6,747,716 B2 | 6/2004 | Kuroiwa et al. |
| 6,748,211 B1 | 6/2004 | Isaac et al. |
| 6,749,308 B1 | 6/2004 | Niendorf et al. |
| 6,755,542 B2 | 6/2004 | Bechtel et al. |
| 6,756,912 B2 | 6/2004 | Skiver et al. |
| 6,757,039 B2 | 6/2004 | Ma |
| 6,757,109 B2 | 6/2004 | Bos |
| D493,131 S | 7/2004 | Lawlor et al. |
| D493,394 S | 7/2004 | Lawlor et al. |
| 6,759,113 B1 | 7/2004 | Tang |
| 6,759,945 B2 | 7/2004 | Richard |
| 6,760,157 B1 | 7/2004 | Allen et al. |
| 6,773,116 B2 | 8/2004 | De Vaan et al. |
| 6,774,356 B2 | 8/2004 | Heslin et al. |
| 6,774,810 B2 | 8/2004 | DeLine et al. |
| 6,778,904 B2 | 8/2004 | Iwami et al. |
| 6,779,900 B1 | 8/2004 | Nolan-Brown |
| 6,784,129 B2 | 8/2004 | Seto et al. |
| 6,797,396 B1 | 9/2004 | Liu et al. |
| 6,800,871 B2 | 10/2004 | Matsuda et al. |
| 6,801,283 B2 | 10/2004 | Koyama et al. |
| 6,805,474 B2 | 10/2004 | Walser et al. |
| 6,806,452 B2 | 10/2004 | Bos et al. |
| 6,806,922 B2 | 10/2004 | Ishitaka |
| 6,810,323 B1 | 10/2004 | Bullock et al. |
| 6,812,907 B1 | 11/2004 | Gennetten et al. |
| 6,819,231 B2 | 11/2004 | Berberich et al. |
| 6,824,281 B2 | 11/2004 | Schofield et al. |
| 6,831,268 B2 | 12/2004 | Bechtel et al. |
| 6,832,848 B2 | 12/2004 | Pastrick |
| 6,834,969 B2 | 12/2004 | Bade et al. |
| 6,836,725 B2 | 12/2004 | Millington et al. |
| 6,842,276 B2 | 1/2005 | Poll et al. |
| 6,845,805 B1 | 1/2005 | Köster |
| 6,846,098 B2 | 1/2005 | Bourdelais et al. |
| 6,847,424 B2 | 1/2005 | Gotoh et al. |
| 6,847,487 B2 | 1/2005 | Burgner |
| 6,848,817 B2 | 2/2005 | Bos et al. |
| 6,849,165 B2 | 2/2005 | Klöppel et al. |
| 6,853,491 B1 | 2/2005 | Ruhle et al. |
| 6,870,655 B1 | 3/2005 | Northman et al. |
| 6,870,656 B2 | 3/2005 | Tonar et al. |
| 6,871,982 B2 | 3/2005 | Holman et al. |
| 6,877,888 B2 | 4/2005 | DeLine et al. |
| 6,882,287 B2 | 4/2005 | Schofield |
| 6,889,064 B2 | 5/2005 | Baratono et al. |
| 6,891,563 B2 | 5/2005 | Schofield et al. |
| 6,902,284 B2 | 6/2005 | Hutzel et al. |
| 6,904,348 B2 | 6/2005 | Drummond et al. |
| 6,906,632 B2 | 6/2005 | DeLine et al. |
| 6,909,486 B2 | 6/2005 | Wang et al. |
| 6,910,779 B2 | 6/2005 | Abel et al. |
| 6,912,396 B2 | 6/2005 | Sziraki et al. |
| 6,916,099 B2 | 7/2005 | Su et al. |
| 6,922,902 B2 | 8/2005 | Schierbeek et al. |
| 6,928,180 B2 | 8/2005 | Stam et al. |
| 6,928,366 B2 | 8/2005 | Ockerse et al. |
| 6,930,737 B2 | 8/2005 | Weindorf et al. |
| 6,934,067 B2 | 8/2005 | Ash et al. |
| 6,946,978 B2 | 9/2005 | Schofield |

| Patent | Date | Inventor |
|---|---|---|
| 6,947,576 B2 | 9/2005 | Stam et al. |
| 6,947,577 B2 | 9/2005 | Stam et al. |
| 6,949,772 B2 | 9/2005 | Shimizu et al. |
| 6,951,410 B2 | 10/2005 | Parsons |
| 6,951,681 B2 | 10/2005 | Hartley et al. |
| 6,952,312 B2 | 10/2005 | Weber et al. |
| 6,958,495 B2 | 10/2005 | Nishijima et al. |
| 6,958,683 B2 | 10/2005 | Mills et al. |
| 6,961,178 B2 | 11/2005 | Sugino et al. |
| 6,963,438 B2 | 11/2005 | Busscher et al. |
| 6,968,273 B2 | 11/2005 | Ockerse et al. |
| 6,972,888 B2 | 12/2005 | Poll et al. |
| 6,974,236 B2 | 12/2005 | Tenmyo |
| 6,975,215 B2 | 12/2005 | Schofield et al. |
| 6,977,702 B2 | 12/2005 | Wu |
| 6,980,092 B2 | 12/2005 | Turnbull et al. |
| 6,985,291 B2 | 1/2006 | Watson et al. |
| 6,992,718 B1 | 1/2006 | Takahara |
| 7,001,058 B2 | 2/2006 | Inditsky |
| 7,004,592 B2 | 2/2006 | Varaprasad et al. |
| 7,004,593 B2 | 2/2006 | Weller et al. |
| 7,006,173 B1 | 2/2006 | Hiyama et al. |
| 7,009,751 B2 | 3/2006 | Tonar et al. |
| 7,012,543 B2 | 3/2006 | DeLine et al. |
| 7,029,156 B2 | 4/2006 | Suehiro et al. |
| 7,038,577 B2 | 5/2006 | Pawlicki et al. |
| 7,041,965 B2 | 5/2006 | Heslin et al. |
| 7,042,616 B2 | 5/2006 | Tonar et al. |
| 7,046,418 B2 | 5/2006 | Lin et al. |
| 7,046,448 B2 | 5/2006 | Burgner |
| 7,050,908 B1 | 5/2006 | Schwartz et al. |
| 7,057,681 B2 | 6/2006 | Hinata et al. |
| 7,063,893 B2 | 6/2006 | Hoffman |
| 7,064,882 B2 | 6/2006 | Tonar et al. |
| 7,074,486 B2 | 7/2006 | Boire et al. |
| 7,081,810 B2 | 7/2006 | Henderson et al. |
| 7,092,052 B2 | 8/2006 | Okamoto et al. |
| 7,095,567 B2 | 8/2006 | Troxell et al. |
| 7,106,213 B2 | 9/2006 | White |
| 7,106,392 B2 | 9/2006 | You |
| 7,108,409 B2 | 9/2006 | DeLine et al. |
| 7,121,028 B2 | 10/2006 | Shoen et al. |
| 7,125,131 B2 | 10/2006 | Olczak |
| 7,130,727 B2 | 10/2006 | Liu et al. |
| 7,132,064 B2 | 11/2006 | Li et al. |
| 7,136,091 B2 | 11/2006 | Ichikawa et al. |
| 7,138,974 B2 | 11/2006 | Hirakata et al. |
| 7,149,613 B2 | 12/2006 | Stam et al. |
| 7,151,515 B2 | 12/2006 | Kim et al. |
| 7,151,997 B2 | 12/2006 | Uhlmann et al. |
| 7,153,588 B2 | 12/2006 | McMan et al. |
| 7,154,657 B2 | 12/2006 | Poll et al. |
| 7,158,881 B2 | 1/2007 | McCarthy et al. |
| 7,160,017 B2 | 1/2007 | Lee et al. |
| 7,161,567 B2 | 1/2007 | Homma et al. |
| 7,167,796 B2 | 1/2007 | Taylor et al. |
| 7,168,830 B2 | 1/2007 | Pastrick et al. |
| 7,175,291 B1 | 2/2007 | Li |
| 7,176,790 B2 | 2/2007 | Yamazaki |
| 7,184,190 B2 | 2/2007 | McCabe et al. |
| 7,185,995 B2 | 3/2007 | Hatanaka et al. |
| 7,187,498 B2 | 3/2007 | Bengoechea et al. |
| 7,188,963 B2 | 3/2007 | Schofield et al. |
| 7,193,764 B2 | 3/2007 | Lin et al. |
| 7,195,381 B2 | 3/2007 | Lynam et al. |
| 7,199,767 B2 | 4/2007 | Spero |
| 7,206,697 B2 | 4/2007 | Olney et al. |
| 7,209,277 B2 | 4/2007 | Tonar et al. |
| 7,215,238 B2 | 5/2007 | Buck et al. |
| 7,215,473 B2 | 5/2007 | Fleming |
| 7,221,363 B2 | 5/2007 | Roberts et al. |
| 7,224,324 B2 | 5/2007 | Quist et al. |
| 7,227,472 B1 | 6/2007 | Roe |
| 7,230,523 B2 | 6/2007 | Harter, Jr. et al. |
| 7,232,231 B2 | 6/2007 | Shih |
| 7,233,304 B1 | 6/2007 | Aratani et al. |
| 7,235,918 B2 | 6/2007 | McCullough et al. |
| 7,241,030 B2 | 7/2007 | Mok et al. |
| 7,241,037 B2 | 7/2007 | Mathieu et al. |
| 7,245,207 B1 | 7/2007 | Dayan et al. |
| 7,245,231 B2 | 7/2007 | Kiefer et al. |
| 7,245,336 B2 | 7/2007 | Hiyama et al. |
| 7,248,305 B2 | 7/2007 | Ootsuta et al. |
| 7,251,079 B2 | 7/2007 | Capaldo et al. |
| 7,255,451 B2 | 8/2007 | McCabe et al. |
| 7,255,465 B2 | 8/2007 | DeLine et al. |
| 7,259,036 B2 | 8/2007 | Borland et al. |
| 7,262,406 B2 | 8/2007 | Heslin et al. |
| 7,262,916 B2 | 8/2007 | Kao et al. |
| 7,265,342 B2 | 9/2007 | Heslin et al. |
| 7,268,841 B2 | 9/2007 | Kasajima et al. |
| 7,269,327 B2 | 9/2007 | Tang |
| 7,269,328 B2 | 9/2007 | Tang |
| 7,271,951 B2 | 9/2007 | Weber et al. |
| 7,274,501 B2 | 9/2007 | McCabe et al. |
| 7,281,491 B2 | 10/2007 | Iwamaru |
| 7,286,280 B2 | 10/2007 | Whitehead et al. |
| 7,287,868 B2 | 10/2007 | Carter et al. |
| 7,289,037 B2 | 10/2007 | Uken et al. |
| 7,290,919 B2 | 11/2007 | Pan et al. |
| 7,292,208 B1 | 11/2007 | Park et al. |
| 7,300,183 B2 | 11/2007 | Kiyomoto et al. |
| 7,302,344 B2 | 11/2007 | Olney et al. |
| 7,308,341 B2 | 12/2007 | Schofield et al. |
| 7,310,177 B2 | 12/2007 | McCabe et al. |
| 7,311,428 B2 | 12/2007 | DeLine et al. |
| 7,316,485 B2 | 1/2008 | Roose |
| 7,317,386 B2 | 1/2008 | Lengning et al. |
| 7,318,664 B2 | 1/2008 | Hatanaka et al. |
| 7,323,819 B2 | 1/2008 | Hong et al. |
| 7,324,043 B2 | 1/2008 | Purden et al. |
| 7,324,174 B2 | 1/2008 | Hafuka et al. |
| 7,324,261 B2 | 1/2008 | Tonar et al. |
| 7,327,225 B2 | 2/2008 | Nicholas et al. |
| 7,327,226 B2 | 2/2008 | Turnbull et al. |
| 7,327,855 B1 | 2/2008 | Chen |
| 7,328,103 B2 | 2/2008 | McCarthy et al. |
| 7,329,013 B2 | 2/2008 | Blank et al. |
| 7,329,850 B2 | 2/2008 | Drummond et al. |
| 7,331,415 B2 | 2/2008 | Hawes et al. |
| 7,338,177 B2 | 3/2008 | Lynam |
| 7,344,284 B2 | 3/2008 | Lynam et al. |
| 7,349,143 B2 | 3/2008 | Tonar et al. |
| 7,349,582 B2 | 3/2008 | Takeda et al. |
| 7,355,524 B2 | 4/2008 | Schofield |
| 7,360,932 B2 | 4/2008 | Uken et al. |
| 7,362,505 B2 | 4/2008 | Hikmet et al. |
| 7,368,714 B2 | 5/2008 | Remillard et al. |
| 7,370,983 B2 | 5/2008 | DeWind et al. |
| 7,372,611 B2 | 5/2008 | Tonar et al. |
| 7,375,895 B2 | 5/2008 | Brynielsson |
| 7,379,224 B2 | 5/2008 | Tonar et al. |
| 7,379,225 B2 | 5/2008 | Tonar et al. |
| 7,379,243 B2 | 5/2008 | Horsten et al. |
| 7,379,814 B2 | 5/2008 | Ockerse et al. |
| 7,379,817 B1 | 5/2008 | Tyson et al. |
| 7,380,633 B2 | 6/2008 | Shen et al. |
| 7,389,171 B2 | 6/2008 | Rupp |
| 7,391,563 B2 | 6/2008 | McCabe et al. |
| 7,396,147 B2 | 7/2008 | Munro |
| 7,411,732 B2 | 8/2008 | Kao et al. |
| 7,412,328 B2 | 8/2008 | Uhlmann et al. |
| 7,417,781 B2 | 8/2008 | Tonar et al. |
| 7,420,159 B2 | 9/2008 | Heslin et al. |
| 7,446,462 B2 | 11/2008 | Lim et al. |
| 7,446,650 B2 | 11/2008 | Scholfield et al. |
| 7,446,924 B2 | 11/2008 | Schofield et al. |
| 7,448,776 B2 | 11/2008 | Tang |
| 7,452,090 B2 | 11/2008 | Weller et al. |
| 7,453,057 B2 | 11/2008 | Drummond et al. |
| 7,455,412 B2 | 11/2008 | Rottcher |
| 7,460,007 B2 | 12/2008 | Schofield et al. |
| 7,467,883 B2 | 12/2008 | DeLine et al. |
| 7,468,651 B2 | 12/2008 | DeLine et al. |
| 7,471,438 B2 | 12/2008 | McCabe et al. |
| 7,474,963 B2 | 1/2009 | Taylor et al. |
| 7,477,439 B2 | 1/2009 | Tonar et al. |
| 7,480,149 B2 | 1/2009 | DeWard et al. |

| | | | |
|---|---|---|---|
| 7,488,080 B2 | 2/2009 | Skiver et al. | |
| 7,488,099 B2 | 2/2009 | Fogg et al. | |
| 7,489,374 B2 | 2/2009 | Utsumi et al. | |
| 7,490,007 B2 | 2/2009 | Taylor et al. | |
| 7,490,943 B2 | 2/2009 | Kikuchi et al. | |
| 7,490,944 B2 | 2/2009 | Blank et al. | |
| 7,494,231 B2 | 2/2009 | Varaprasad et al. | |
| 7,495,719 B2 | 2/2009 | Adachi et al. | |
| 7,496,439 B2 | 2/2009 | McCormick | |
| 7,502,156 B2 | 3/2009 | Tonar et al. | |
| 7,505,188 B2 | 3/2009 | Niiyama et al. | |
| 7,511,607 B2 | 3/2009 | Hubbard et al. | |
| 7,511,872 B2 | 3/2009 | Tonar et al. | |
| 7,525,715 B2 | 4/2009 | McCabe et al. | |
| 7,526,103 B2 | 4/2009 | Schofield et al. | |
| 7,533,998 B2 | 5/2009 | Schofield et al. | |
| 7,538,316 B2 | 5/2009 | Heslin et al. | |
| 7,540,620 B2 | 6/2009 | Weller et al. | |
| 7,541,570 B2 | 6/2009 | Drummond et al. | |
| 7,542,193 B2 | 6/2009 | McCabe et al. | |
| 7,543,947 B2 | 6/2009 | Varaprasad et al. | |
| 7,547,467 B2 | 6/2009 | Olson et al. | |
| 7,548,291 B2 | 6/2009 | Lee et al. | |
| 7,551,354 B2 | 6/2009 | Horsten et al. | |
| 7,561,181 B2 | 7/2009 | Schofield et al. | |
| 7,562,985 B2 | 7/2009 | Cortenraad et al. | |
| 7,567,291 B2 | 7/2009 | Bechtel et al. | |
| 7,571,038 B2 | 8/2009 | Butler et al. | |
| 7,571,042 B2 | 8/2009 | Taylor et al. | |
| 7,572,490 B2 | 8/2009 | Park et al. | |
| 7,579,939 B2 | 8/2009 | Schofield et al. | |
| 7,579,940 B2 | 8/2009 | Schofield et al. | |
| 7,580,795 B2 | 8/2009 | McCarthy et al. | |
| 7,581,859 B2 | 9/2009 | Lynam | |
| 7,581,867 B2 | 9/2009 | Lee et al. | |
| 7,583,184 B2 | 9/2009 | Schofield et al. | |
| 7,586,566 B2 | 9/2009 | Nelson et al. | |
| 7,586,666 B2 | 9/2009 | McCabe et al. | |
| 7,589,893 B2 | 9/2009 | Rottcher | |
| 7,600,878 B2 | 10/2009 | Blank et al. | |
| 7,619,508 B2 | 11/2009 | Lynam et al. | |
| 7,623,202 B2 | 11/2009 | Araki et al. | |
| 7,626,749 B2 | 12/2009 | Baur et al. | |
| 7,633,567 B2 | 12/2009 | Yamada et al. | |
| 7,636,188 B2 | 12/2009 | Baur et al. | |
| 7,636,195 B2 | 12/2009 | Nieuwkerk et al. | |
| 7,636,930 B2 | 12/2009 | Chang | |
| 7,643,200 B2 | 1/2010 | Varaprasad et al. | |
| 7,643,927 B2 | 1/2010 | Hils | |
| 7,651,228 B2 | 1/2010 | Skiver et al. | |
| 7,658,521 B2 | 2/2010 | DeLine et al. | |
| 7,663,798 B2 | 2/2010 | Tonar et al. | |
| 7,667,579 B2 | 2/2010 | DeLine et al. | |
| 7,670,016 B2 | 3/2010 | Weller et al. | |
| 7,688,495 B2 | 3/2010 | Tonar et al. | |
| 7,695,174 B2 | 4/2010 | Takayanagi et al. | |
| 7,696,964 B2 | 4/2010 | Lankhorst et al. | |
| 7,706,046 B2 | 4/2010 | Bauer et al. | |
| 7,710,631 B2 | 5/2010 | McCabe et al. | |
| 7,711,479 B2 | 5/2010 | Taylor et al. | |
| 7,726,822 B2 | 6/2010 | Blank et al. | |
| 7,728,276 B2 | 6/2010 | Drummond et al. | |
| 7,728,721 B2 | 6/2010 | Schofield et al. | |
| 7,728,927 B2 | 6/2010 | Nieuwkerk et al. | |
| 7,734,392 B2 | 6/2010 | Schofield et al. | |
| 7,746,534 B2 | 6/2010 | Tonar et al. | |
| 7,787,077 B2 | 8/2010 | Kondoh et al. | |
| 7,791,694 B2 | 9/2010 | Molsen et al. | |
| 7,830,583 B2 | 11/2010 | Neuman et al. | |
| 7,842,154 B2 | 11/2010 | Lynam | |
| 7,871,169 B2 | 1/2011 | Varaprasad et al. | |
| 7,906,756 B2 * | 3/2011 | Drummond et al. | 250/214 AL |
| 2001/0019356 A1 | 9/2001 | Takeda et al. | |
| 2001/0022616 A1 | 9/2001 | Rademacher et al. | |
| 2001/0026215 A1 | 10/2001 | Nakaho et al. | |
| 2001/0026316 A1 | 10/2001 | Senatore | |
| 2001/0030857 A1 | 10/2001 | Futhey et al. | |
| 2001/0045981 A1 | 11/2001 | Gloger et al. | |
| 2002/0036828 A1 | 3/2002 | Wong | |
| 2002/0044065 A1 | 4/2002 | Quist et al. |
| 2002/0049535 A1 | 4/2002 | Rigo et al. |
| 2002/0085155 A1 | 7/2002 | Arikawa |
| 2002/0092958 A1 | 7/2002 | Lusk |
| 2002/0118321 A1 | 8/2002 | Ge |
| 2002/0133144 A1 | 9/2002 | Chan et al. |
| 2002/0149727 A1 | 10/2002 | Wang |
| 2002/0154007 A1 | 10/2002 | Yang |
| 2002/0196639 A1 | 12/2002 | Weidel |
| 2003/0002165 A1 | 1/2003 | Mathias et al. |
| 2003/0002179 A1 | 1/2003 | Roberts et al. |
| 2003/0007261 A1 | 1/2003 | Hutzel et al. |
| 2003/0016287 A1 | 1/2003 | Nakayama et al. |
| 2003/0016543 A1 | 1/2003 | Pastrick et al. |
| 2003/0025596 A1 | 2/2003 | Lang et al. |
| 2003/0030546 A1 | 2/2003 | Tseng |
| 2003/0030724 A1 | 2/2003 | Okamoto |
| 2003/0035050 A1 | 2/2003 | Mizusawa et al. |
| 2003/0043269 A1 | 3/2003 | Park |
| 2003/0043589 A1 | 3/2003 | Blank |
| 2003/0048639 A1 | 3/2003 | Boyd et al. |
| 2003/0052969 A1 | 3/2003 | Satoh et al. |
| 2003/0058338 A1 | 3/2003 | Kawauchi et al. |
| 2003/0069690 A1 | 4/2003 | Correia et al. |
| 2003/0080877 A1 | 5/2003 | Takagi et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0095331 A1 | 5/2003 | Bengoechea et al. |
| 2003/0098908 A1 | 5/2003 | Misaiji et al. |
| 2003/0101749 A1 | 6/2003 | Lingle et al. |
| 2003/0103142 A1 | 6/2003 | Hitomi et al. |
| 2003/0117522 A1 | 6/2003 | Okada |
| 2003/0122929 A1 | 7/2003 | Minuado et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0156193 A1 | 8/2003 | Nakamura |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0206256 A1 | 11/2003 | Drain et al. |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 2/2004 | Lin |
| 2004/0032321 A1 | 2/2004 | McMahon et al. |
| 2004/0032655 A1 | 2/2004 | Kikuchi et al. |
| 2004/0032676 A1 | 2/2004 | Drummond et al. |
| 2004/0036768 A1 | 2/2004 | Green |
| 2004/0046870 A1 | 3/2004 | Leigh Travis |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0077359 A1 | 4/2004 | Bernas et al. |
| 2004/0080404 A1 | 4/2004 | White |
| 2004/0085196 A1 | 5/2004 | Miller et al. |
| 2004/0085499 A1 | 5/2004 | Baek |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0105614 A1 | 6/2004 | Kobayashi et al. |
| 2004/0107030 A1 | 6/2004 | Nishira et al. |
| 2004/0109060 A1 | 6/2004 | Ishii |
| 2004/0114039 A1 | 6/2004 | Ishikura |
| 2004/0170008 A1 | 9/2004 | Tenmyo |
| 2004/0202001 A1 | 10/2004 | Roberts et al. |
| 2004/0239849 A1 | 12/2004 | Wang |
| 2004/0243303 A1 | 12/2004 | Padmanabhan |

| | | |
|---|---|---|
| 2004/0264011 A1 | 12/2004 | Lynam |
| 2005/0024591 A1 | 2/2005 | Lian et al. |
| 2005/0024729 A1 | 2/2005 | Ockerse et al. |
| 2005/0078389 A1 | 4/2005 | Kulas et al. |
| 2005/0079326 A1 | 4/2005 | Varaprasad et al. |
| 2005/0099559 A1 | 5/2005 | Lee et al. |
| 2005/0099693 A1 | 5/2005 | Schofield et al. |
| 2005/0111070 A1 | 5/2005 | Lin et al. |
| 2005/0117095 A1 | 6/2005 | Ma |
| 2005/0134983 A1 | 6/2005 | Lynam |
| 2005/0140855 A1 | 6/2005 | Utsumi et al. |
| 2005/0168995 A1 | 8/2005 | Kittelmann et al. |
| 2005/0169003 A1 | 8/2005 | Lindahl et al. |
| 2005/0172504 A1 | 8/2005 | Ohm et al. |
| 2005/0237440 A1 | 10/2005 | Sugimura et al. |
| 2005/0270766 A1 | 12/2005 | Kung et al. |
| 2006/0001641 A1 | 1/2006 | Degwekar et al. |
| 2006/0050018 A1 | 3/2006 | Hutzel et al. |
| 2006/0061008 A1 | 3/2006 | Karner et al. |
| 2006/0076860 A1 | 4/2006 | Hoss |
| 2006/0139953 A1 | 6/2006 | Chou et al. |
| 2006/0164230 A1 | 7/2006 | DeWind et al. |
| 2006/0171704 A1 | 8/2006 | Bingle et al. |
| 2006/0274218 A1 | 12/2006 | Xue |
| 2007/0041096 A1 | 2/2007 | Nieuwkerk et al. |
| 2007/0058257 A1 | 3/2007 | Lynam |
| 2007/0064108 A1 | 3/2007 | Haler |
| 2007/0080585 A1 | 4/2007 | Lyu |
| 2007/0118287 A1 | 5/2007 | Taylor et al. |
| 2007/0183037 A1 | 8/2007 | De Boer et al. |
| 2007/0183066 A1 | 8/2007 | Varaprasad et al. |
| 2007/0184284 A1 | 8/2007 | Varaprasad et al. |
| 2007/0201122 A1 | 8/2007 | Dozeman et al. |
| 2007/0262732 A1 | 11/2007 | Shen |
| 2008/0002106 A1 | 1/2008 | Van De Witte et al. |
| 2008/0030311 A1 | 2/2008 | Dayan et al. |
| 2008/0068520 A1 | 3/2008 | Minikey, Jr. et al. |
| 2008/0077882 A1 | 3/2008 | Kramer et al. |
| 2008/0094685 A1 | 4/2008 | Varaprasad et al. |
| 2008/0180529 A1 | 7/2008 | Taylor et al. |
| 2008/0180781 A1 | 7/2008 | Varaprasad et al. |
| 2008/0212189 A1 | 9/2008 | Baur et al. |
| 2008/0225538 A1 | 9/2008 | Lynam et al. |
| 2008/0231704 A1 | 9/2008 | Schofield et al. |
| 2008/0266389 A1 | 10/2008 | DeWind et al. |
| 2008/0291522 A1 | 11/2008 | Varaprasad et al. |
| 2009/0002491 A1 | 1/2009 | Haler |
| 2009/0015736 A1 | 1/2009 | Weller et al. |
| 2009/0033837 A1 | 2/2009 | Molsen et al. |
| 2009/0040465 A1 | 2/2009 | Conner et al. |
| 2009/0040588 A1 | 2/2009 | Tonar et al. |
| 2009/0040778 A1 | 2/2009 | Takayanagi et al. |
| 2009/0052003 A1 | 2/2009 | Schofield et al. |
| 2009/0067032 A1 | 3/2009 | Varaprasad et al. |
| 2009/0080055 A1 | 3/2009 | Baur et al. |
| 2009/0085729 A1 | 4/2009 | Nakamura et al. |
| 2009/0096937 A1 | 4/2009 | Bauer et al. |
| 2009/0141331 A1 | 6/2009 | Skiver et al. |
| 2009/0174776 A1 | 7/2009 | Taylor et al. |
| 2009/0184904 A1 | 7/2009 | S. et al. |
| 2009/0201137 A1 | 8/2009 | Weller et al. |
| 2009/0219394 A1 | 9/2009 | Heslin et al. |
| 2009/0231741 A1 | 9/2009 | Weller et al. |
| 2009/0237820 A1 | 9/2009 | McCabe et al. |
| 2009/0243824 A1 | 10/2009 | Hook et al. |
| 2009/0244740 A1 | 10/2009 | Takayanagi et al. |
| 2009/0262192 A1 | 10/2009 | Schofield et al. |
| 2009/0262422 A1 | 10/2009 | Cross et al. |
| 2009/0290369 A1 | 11/2009 | Schofield et al. |
| 2009/0296190 A1 | 12/2009 | Anderson et al. |
| 2010/0033797 A1 | 2/2010 | Schofield et al. |
| 2010/0045790 A1 | 2/2010 | Lynam et al. |
| 2010/0045899 A1 | 2/2010 | Ockerse |
| 2010/0046059 A1 | 2/2010 | McCabe et al. |
| 2010/0053723 A1 | 3/2010 | Varaprasad et al. |
| 2010/0085645 A1 | 4/2010 | Skiver et al. |
| 2010/0091509 A1 | 4/2010 | DeLine et al. |
| 2010/0110523 A1 | 5/2010 | Varaprasad et al. |
| 2010/0110553 A1 | 5/2010 | Anderson et al. |
| 2010/0117815 A1 | 5/2010 | Deline et al. |
| 2010/0126030 A1 | 5/2010 | Weller et al. |
| 2010/0165437 A1 | 7/2010 | Tonar et al. |
| 2010/0172008 A1 | 7/2010 | McCabe et al. |
| 2010/0174485 A1 | 7/2010 | Taylor et al. |
| 2010/0194890 A1 | 8/2010 | Weller et al. |
| 2010/0195226 A1 | 8/2010 | Heslin et al. |
| 2010/0201896 A1 | 8/2010 | Ostreko et al. |
| 2010/0202075 A1 | 8/2010 | Blank et al. |
| 2010/0207013 A1 | 8/2010 | Drummond et al. |
| 2010/0214662 A1 | 8/2010 | Takayanagi et al. |
| 2010/0219985 A1 | 9/2010 | Schofield et al. |
| 2010/0222963 A1 | 9/2010 | Schofield et al. |
| 2010/0245701 A1 | 9/2010 | Sato et al. |
| 2010/0246017 A1 | 9/2010 | Tonar et al. |
| 2010/0277786 A1 | 11/2010 | Anderson et al. |
| 2011/0109746 A1 | 5/2011 | Schofield et al. |
| 2011/0141543 A1 | 6/2011 | Uken et al. |

FOREIGN PATENT DOCUMENTS

| | | |
|---|---|---|
| CN | 1189224 | 7/1998 |
| DE | 941408 | 4/1956 |
| DE | 944531 | 7/1956 |
| DE | 7323996 | 11/1973 |
| DE | 3248511 A1 | 7/1984 |
| DE | 3301945 | 7/1984 |
| DE | 3614882 | 11/1987 |
| DE | 9306989.8 U1 | 7/1993 |
| DE | 4329983 | 8/1995 |
| DE | 4444443 A1 | 6/1996 |
| DE | 29703084 U1 | 6/1997 |
| DE | 29805142 U1 | 5/1998 |
| DE | 19741896 | 4/1999 |
| DE | 19755008 | 7/1999 |
| DE | 29902344 U1 | 7/1999 |
| DE | 19934999 | 2/2001 |
| DE | 19943355 | 3/2001 |
| DE | 20118868 | 3/2002 |
| DE | 10131459 | 1/2003 |
| EP | 0299509 A2 | 1/1989 |
| EP | 0513476 A1 | 11/1992 |
| EP | 0524766 | 1/1993 |
| EP | 0729864 A1 | 12/1995 |
| EP | 0728618 A2 | 8/1996 |
| EP | 0825477 | 2/1998 |
| EP | 0830985 | 3/1998 |
| EP | 0928723 A2 | 7/1999 |
| EP | 937601 A2 | 8/1999 |
| EP | 1075986 | 2/2001 |
| EP | 1097848 A | 5/2001 |
| EP | 1152285 A2 | 11/2001 |
| EP | 1256833 | 11/2002 |
| EP | 0899157 | 10/2004 |
| EP | 1315639 | 2/2006 |
| FR | 1021987 A | 2/1953 |
| FR | 1461419 | 12/1966 |
| FR | 2585991 | 2/1987 |
| FR | 2672857 A1 | 8/1992 |
| FR | 2673499 A1 | 9/1992 |
| FR | 2759045 | 8/1998 |
| GB | 810010 | 3/1959 |
| GB | 934037 | 8/1963 |
| GB | 1008411 | 10/1965 |
| GB | 1136134 | 12/1968 |
| GB | 1553376 | 9/1979 |
| GB | 2137573 A | 10/1984 |
| GB | 2161440 | 1/1986 |
| GB | 2192370 | 1/1988 |
| GB | 2222991 | 3/1990 |
| GB | 2255539 A | 11/1992 |
| GB | 2351055 A | 12/2000 |
| GB | 2362494 | 11/2001 |
| JP | 50-000638 A | 1/1975 |
| JP | 52-146988 | 11/1977 |
| JP | 55-039843 | 3/1980 |
| JP | 57-30639 | 2/1982 |
| JP | 57-208530 | 12/1982 |
| JP | 58-030729 | 2/1983 |
| JP | 58-110334 | 6/1983 |

| | | |
|---|---|---|
| JP | 58-180347 | 10/1983 |
| JP | 58-209635 | 12/1983 |
| JP | 59-114139 | 7/1984 |
| JP | 60-212730 | 10/1985 |
| JP | 60-261275 | 12/1985 |
| JP | 61127186 | 6/1986 |
| JP | 61-260217 | 11/1986 |
| JP | 62-043543 | 2/1987 |
| JP | 62-075619 | 4/1987 |
| JP | 62-122487 | 6/1987 |
| JP | 63-02753 | 1/1988 |
| JP | 63-106730 | 5/1988 |
| JP | 63-106731 | 5/1988 |
| JP | 63-274286 | 11/1988 |
| JP | 64-14700 | 1/1989 |
| JP | 01-123587 | 5/1989 |
| JP | 02-122844 | 10/1990 |
| JP | 03-28947 | 3/1991 |
| JP | 03-052097 | 3/1991 |
| JP | 30-061192 | 3/1991 |
| JP | 03-110855 | 5/1991 |
| JP | 03-243914 | 10/1991 |
| JP | 04-114587 | 4/1992 |
| JP | 04-245886 | 9/1992 |
| JP | 05-213113 | 8/1993 |
| JP | 05-257142 | 10/1993 |
| JP | 60-80953 A | 3/1994 |
| JP | 61-07035 A | 4/1994 |
| JP | 62-27318 A | 8/1994 |
| JP | 06318734 | 11/1994 |
| JP | 07-175035 | 7/1995 |
| JP | 07-266928 | 10/1995 |
| JP | 07-277072 | 10/1995 |
| JP | 07-281185 | 10/1995 |
| JP | 08-008083 | 1/1996 |
| JP | 08-083581 | 3/1996 |
| JP | 08-216789 | 8/1996 |
| JP | 09-260074 | 3/1997 |
| JP | 05-077657 | 7/1997 |
| JP | 09-220976 | 8/1997 |
| JP | 09-266078 | 10/1997 |
| JP | 09-288262 | 11/1997 |
| JP | 10-076880 | 3/1998 |
| JP | 10-199480 | 7/1998 |
| JP | 10-206643 | 8/1998 |
| JP | 11-038381 | 2/1999 |
| JP | 11-067485 | 3/1999 |
| JP | 11-078693 | 3/1999 |
| JP | 11-109337 | 4/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 | 5/2000 |
| JP | 2000-153736 | 6/2000 |
| JP | 2000-159014 | 6/2000 |
| JP | 2000-255321 | 9/2000 |
| JP | 2000-330107 | 11/2000 |
| JP | 2001-083509 | 3/2001 |
| JP | 2001-222005 | 8/2001 |
| JP | 200272901 | 3/2002 |
| JP | 2002-120649 | 4/2002 |
| JP | 2002-122860 | 4/2002 |
| JP | 2002162626 | 6/2002 |
| JP | 2002-352611 | 12/2002 |
| JP | 2003-267129 | 9/2003 |
| JP | 2004-182156 | 7/2004 |
| JP | 2005-148119 | 6/2005 |
| JP | 2005-327600 | 11/2005 |
| JP | 38-46073 | 11/2006 |
| WO | WO 82/02448 | 7/1982 |
| WO | WO8606179 | 10/1986 |
| WO | WO 94/19212 | 9/1994 |
| WO | WO 96/21581 | 7/1996 |
| WO | WO 98/14974 | 4/1998 |
| WO | WO 98/38547 | 9/1998 |
| WO | WO 99/15360 | 4/1999 |
| WO | WO 00/23826 | 4/2000 |
| WO | WO 00/52661 | 9/2000 |
| WO | WO 00/55685 | 9/2000 |
| WO | WO 01/01192 | 1/2001 |
| WO | WO 02/18174 | 3/2002 |
| WO | WO 02/49881 | 6/2002 |
| WO | WO 03/021343 | 3/2003 |

OTHER PUBLICATIONS

Edgar, Julian; Goodbye 12 Volts . . . Hello 42 Volts!; Oct. 5, 1999; Autospeed 50; Issue 50; www.autospeed.co.nz/cms/A_0319/article.html.

Kobe, Gerry; 42 Volts Goes Underhood; Mar. 2000; Automotive Industries; Cahners Publishing Company; www.findarticles.com/p/articles/mi_m3012/is_3_180/ai_61361677.

Jewett, Dale; Aug. 2000; Automotive Industries; Cahners Publising Company; www.findarticles.com/p/articles/mi_m3012/is_8_180ai_64341779.

National Semiconductor, LM78S40, Universal Switching Regulator Subsystem, National Semiconductor Corporation, Apr. 1996, p. 6.

Dana H. Ballard and Christopher M. Brown, Computer Vision, Prentice-Hall, Englewood Cliffs, New Jersey, 5 pages, 1982.

G. Wang, D. Renshaw, P.B. Denyer and M. Lu, CMOS Video Cameras, article, 1991, 4 pages, University of Edinburgh, UK.

* cited by examiner

VEHICLE REARVIEW MIRROR SYSTEM

CROSS REFERENCE TO RELATED APPLICATIONS

The present application is a continuation of U.S. patent application Ser. No. 12/766,150, filed Apr. 23, 2010, now U.S. Pat. No. 7,906,756, which is a continuation of U.S. patent application Ser. No. 12/473,863, filed May 28, 2009, now U.S. Pat. No. 7,728,276, which is a continuation of U.S. patent application Ser. No. 12/268,009, filed Nov. 10, 2008, now U.S. Pat. No. 7,541,570, which is a continuation of U.S. patent application Ser. No. 12/029,172, filed Feb. 11, 2008, now U.S. Pat. No. 7,453,057, which is a continuation of U.S. patent application Ser. No. 11/735,777, filed Apr. 16, 2007, now U.S. Pat. No. 7,329,850, which is a continuation of U.S. patent application Ser. No. 10/955,694, filed Sep. 30, 2004, now U.S. Pat. No. 7,205,524, which is a division of U.S. patent application Ser. No. 10/427,026, filed Apr. 30, 2003, now U.S. Pat. No. 6,918,674, which claims priority of U.S. provisional applications Ser. No. 60/377,561, filed May 3, 2002; and Ser. No. 60/426,227, filed Nov. 14, 2002, which are all hereby incorporated herein by reference in their entireties.

FIELD OF THE INVENTION

The present invention relates generally to vehicle rearview mirror systems and, more particularly, to such mirror systems having self-dimming mirrors, and to such mirror systems having a display in a rearview mirror.

BACKGROUND OF THE INVENTION

Automatic rearview mirrors which automatically control the glare from the headlights of, following vehicles, or when driving away from the setting sun, have been produced and installed in vehicles for many years. Glare reflected in these mirrors has been adjusted by employing motorized prismatic mirrors, liquid crystal shutters and, most successfully, electrochromic mirror reflective elements in which the reflectivity of the mirror is responsive to an applied voltage. While a variety of light measuring and control systems have been proposed and used, such as described in U.S. Pat. No. 3,601,614 issued to Platzer, Jr. and U.S. Pat. No. 3,600,951 issued to Jordan et al., among others, a particularly successful commercial system has relied on two cadmium sulfide light sensors, one sensing ambient light levels and the other sensing rearward glare sources. Typical control systems utilizing this type of devices are described in commonly assigned U.S. Pat. No. 5,715,093 issued to Schierbeek et al.

Many of the characteristics of cadmium sulfide light sensors are well suited to the functional objectives of an automatic mirror control circuit, and their use has contributed to the cost effectiveness of the mirror system in which they are used and the consequent commercial success of these systems.

In recent years, efforts have been made to eliminate cadmium from vehicle systems. In one such effort undertaken in Europe, the vehicle is designed to be recycled, and material, such as cadmium, is restricted. Consequently, it is desirable to utilize light sensors in automatic rearview mirror control circuits which are based upon alternative materials and ideally which achieve the response in performance and cost previously achieved with circuits utilizing cadmium sulfide devices. In this manner, the manufacturer can continue to offer the comfort and advantages of glare control mirrors to the driving public at affordable prices.

Attempts have been made in the art involving vehicle rearview mirror systems having tandem light sensors and light signals that are integrated over predetermined integration periods, Examples of such art include U.S. Pat. Nos. 6,008,486; 6,359,274; 6,379,013 and 6,402,328, the disclosures of which are hereby incorporated herein by reference.

It is also known to provide a display through a mirrored electrochromic cell of an electrochromic mirror, while blocking the view of the display structure or device through the mirrored surface. When such a display is implemented in an interior rearview mirror assembly of a vehicle, it is possible to provide the driver of the vehicle with the full use of the mirror surface when the data display is not required or activated. This also allows the use of a larger display area, and consequently, a larger character size, than is typically possible when the display is located in the mirror frame or bezel, or if a permanent non-mirrored display window is provided within the mirror area. Such a display is commonly referred to as "display on demand".

Although a display on demand provides the above benefits to a driver of the vehicle, such a display requires brightness or intensity control of the display for optimum readability in all lighting conditions. Traditional rearview mirror displays have a relatively constant brightness background field on which characters are displayed, such as a dark lens surface with low reflectivity or the like. In such displays, it is typical to control the display brightness according only to ambient lighting conditions, such that in bright ambient lighting conditions, the display is bright enough to read, but in low ambient lighting conditions, the display is not so bright that it is annoying or distracting to the driver of the vehicle. For example, a very bright display in dark driving conditions can reduce the driver's ability to discern detail in the forward view, since such a display may cause the driver's pupils to adjust in order to accommodate the bright light source. However, because the reflectivity of a reflective element of an electrochromic mirror is variable or adjustable, the intensity of the display may be further controlled or adjusted to maintain a desired contrast ratio between the display and the reflected scene,

SUMMARY OF THE INVENTION

The present invention provides for the utilization of commercially available, low cost, silicon-based light-sensing devices in automatic rearview mirror control systems. The present invention also provides a control for a display through a mirrored surface of a vehicular rearview mirror which is operable to adjust the intensity or brightness of the display in response to the brightness of a scene rearward of the vehicle.

A vehicle rearview minor system, according to an aspect of the invention, includes an electro-optic reflective element, an ambient light sensor that is operable to sense ambient light, a glare light sensor that is operable to sense glare-producing light, and a circuit that is responsive to the ambient and glare light sensors and which establishes a reflectance level of the reflective element. The circuit includes a sensor-responsive device and a controller. The sensor-responsive device produces an output that is a function of light sensed by one of the glare and ambient light sensors. The controller connects one of the glare and ambient light sensors at a time with the sensor-responsive device in order to establish the ambient and glare light levels and thereby the reflectance level of the reflective element.

A vehicle rearview minor system, according to another aspect of the invention, includes an electro-optic reflective element and ambient light sensor that is operable to sense ambient light, a glare light sensor that is operable to sense glare-producing light, and a circuit that is responsive to the ambient and glare light sensors and which produces an output that establishes a reflectance level of the reflective element. The circuit includes a charge accumulation device, a comparison function and a controller. The comparison function compares an output of the charge accumulation device with a reference. The controller connects one of the glare and ambient light sensors at a time with the charge accumulation device and establishes the ambient and glare light levels and thereby the reflectance level of the reflective element from the comparison function. The controller establishes light levels as a function of time for the output of the accumulation device to reach the reference.

A vehicle rearview mirror system, according to another aspect of the invention, includes an interior rearview mirror assembly having an interior electro-optic reflective element and at least one exterior rearview mirror assembly having an exterior electro-optic reflective element. The system further includes an ambient light sensor that is operable to sense ambient light, a glare light sensor that is operable to sense glare-producing light, and a circuit that is responsive to the ambient and glare light sensors and which establishes reflectance levels of the interior reflective element and the exterior reflective element. The circuit includes a sensor-responsive device and a controller. The sensor-responsive device produces at least one output that is a function of light sensed by the glare and ambient light sensors. The controller connects one of the glare and ambient light sensors at a time with the sensor-responsive device to establish the ambient and glare light levels and thereby the reflectance levels of the interior reflective element and the exterior reflective element.

The various aspects of the present invention utilize common integration elements to measure the light sensors sequentially such that errors due to, for example, component variations are corresponding for both glare and ambient measurements. This facilitates use of . mass-produced silicon sensors and avoids the need for matching of components. The various aspects of the invention also achieve sensing of wide input light level dynamic range using off-the-shelf light sensors.

According to another aspect of the present invention, an electrochromic rearview mirror system includes a display which is viewable through a mirrored surface of the rearview mirror system. The mirror system includes a display intensity control which is operable to adjust an intensity of the display in at least part of its operating range in response to a brightness level of a scene rearward of the vehicle.

The control may be operable as a function of the ambient light levels (from a forward facing and/or rearward facing light sensor) and a value representative of the amount of light impinging the rearward facing rearview mirror surface. The control may be further responsive to a modulating effect of an electrochromic cell of the electrochromic rearview mirror system.

According to another aspect of the present invention, an electrochromic rearview mirror system includes a rearview mirror assembly having an electrochromic reflective element and a display operable to project light through the reflective element. The mirror system includes a control operable to adjust an intensity of the display. The mirror system also includes an ambient light sensor operable to detect ambient light levels generally at the mirror assembly and to generate an output signal indicative of an ambient light value, and a glare sensor operable to detect glare or light impinging on the reflective element of the mirror assembly and to generate an output signal indicative of a glare light value. The control is operable to control the intensity of the display as a function of a modulation effect of the electrochromic reflective element and the glare value and ambient light value.

The control may control the display intensity of the display in response to a function of the ambient light value and time to limit rapid fluctuations of the display intensity. The control may control a fully compensated display intensity via the following function or equation: $I(fc)=Fn(ME*GV/AV)*Fn(AV,t)*ME-\frac{1}{2}$; where ME is the modulation effect of the reflective element, GV is the glare value, AV is the ambient light value and t is time.

Therefore, the present invention provides an electrochromic rearview mirror system incorporating a display and a display intensity control which includes an intensity adjustment responsive in at least part of its operating range to the brightness of the rearward scene. The display intensity is adjusted to maintain an appropriate intensity level where it is easily viewable by the driver of the vehicle. The display intensity is bright enough to be seen clearly yet not so bright to annoy or distract the driver. The display intensity is also controlled to provide a sufficient contrast ratio against the variable background brightness of the reflected scene.

These and other objects, advantages, purposes and features of the present invention will become apparent upon review of the following specification in conjunction with the drawings.

DESCRIPTION OF THE PREFERRED EMBODIMENTS

Figure 1:
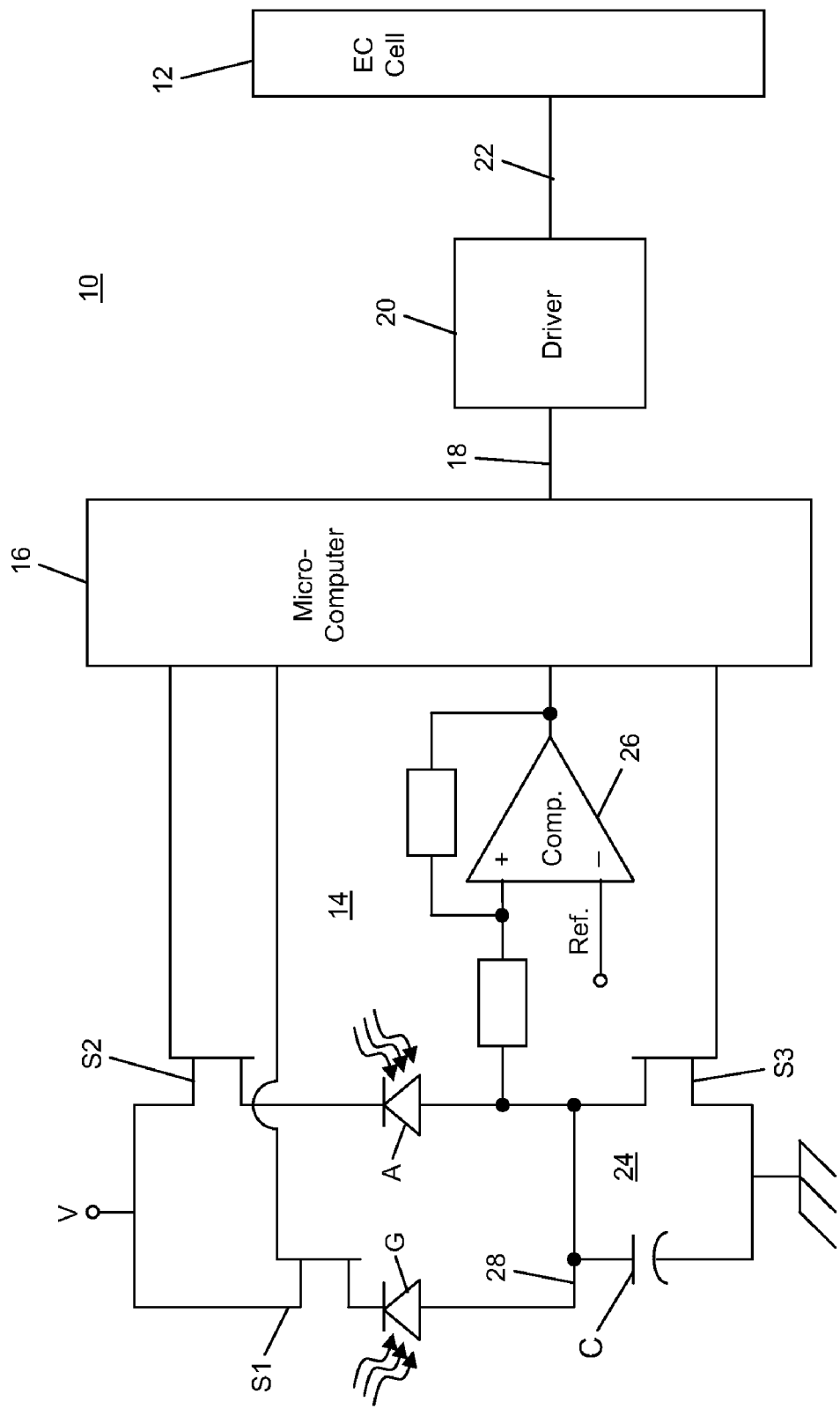
FIG. 1 is an electrical schematic diagram of a vehicle rearview mirror system in accordance with the present invention.

Referring now specifically to the drawings, and the illustrative embodiments depicted therein, a vehicle rearview mirror system 10 includes an electro-optic reflective element 12, an ambient light sensor A that is operable to sense ambient light, a glare light sensor G that is operable to sense glare-producing light, and a circuit 14 that responds to ambient light sensor A and glare light sensor G and which establishes a reflectance level of reflective element 12 (FIG. 1). Circuit 14 includes a controller 16, which may be defined by a microcontroller, such as a microcomputer, which produces an output 18 indicative of a desired reflectance level of reflective element 12, and a driver 20 which produces an output signal at 22 which establishes the reflectance level of reflective element 12. Driver 20 may be of various configurations. One such configuration includes a switching device which is operable by controller 16 at a particular duty cycle to establish the reflectance level of reflective element 12, such as disclosed in commonly assigned U.S. Pat. No. 6,056,410, issued to Hoekstra et al., and U.S. Pat. No. 6,089,721, issued to Schierbeek, the disclosures of which are hereby incorporated herein by reference.

Circuit 14 includes a sensor-responsive device 24 defined by a capacitor C and a comparator 26 that is connected with ambient light sensor A and glare light sensor G. Comparator 26 may be a separate device or may be incorporated as one or more inputs of microcomputer 16. Circuit 14 includes switches S1, S2 and S3, which are electronic switches, such as field effect transistors (FET), that are operated by outputs of controller 16. Alternatively, bipolar transistors may be used. Switch S1 selectively connects glare light sensor G between a voltage source V and a terminal 28 of capacitor C. The other terminal of capacitor C is connected to chassis or ground. Switch S2 selectively connects ambient light sensor A with terminal 28 of capacitor C. Switch S3 is in parallel with capacitor C. Terminal 28 is connected with the non-inverting input of comparator 26. The inverting input of comparator 26 is connected with a reference voltage. The reference voltage may be developed by any known means, such as by a voltage divider connected with voltage source V, or the like. In the embodiment illustrated in FIG. 1, the reference voltage is fixed. However, in the other embodiments described below, the reference voltage may be variable. Also, other component arrangements may perform the same function. By way of example, the capacitor may be connected with the voltage source and the light sensors may be connected between the capacitor and ground.

Controller or microcomputer 16 operates switches S1, S2 and S3 to selectably charge and discharge capacitor C. For example, controller 16 may first actuate switch S1, Referring to FIGS. 2a and 2b, with switch S1 actuated, capacitor C is charged by a current through glare light sensor G developed by voltage V. The current charging capacitor C is a function of the amount of light sensed by glare light sensor G. The more light sensed by glare light sensor G, the faster capacitor C is charged. As capacitor C is charged, a voltage developed at terminal 28 is compared by comparator 26 against the reference voltage. When the voltage across capacitor C reaches the reference voltage, controller 16 causes switch S1 to open. The accumulation time interval between the closing of switch S1 and the opening of switch S1 is defined as the glare time interval Tg. After a short duration of time after switch S1 has been opened, controller 16 causes switch S3 to close for a period of time, thereby discharging capacitor C. After another brief duration of time, controller 16 closes switch S2 which causes a current to flow through ambient light sensor A, thereby charging capacitor C at a rate that is a function of the light sensed by ambient light sensor A. When the voltage at terminal 28 reaches the reference voltage of comparator 26, the output of comparator 26 changes state which is monitored by controller 16. In response, controller 16 causes switch S2 to open, thereby defining the end of ambient charge accumulation period Ta. After a brief duration of time, controller 16 again closes switch S3, thereby again discharging capacitor C.

Figure 2A:
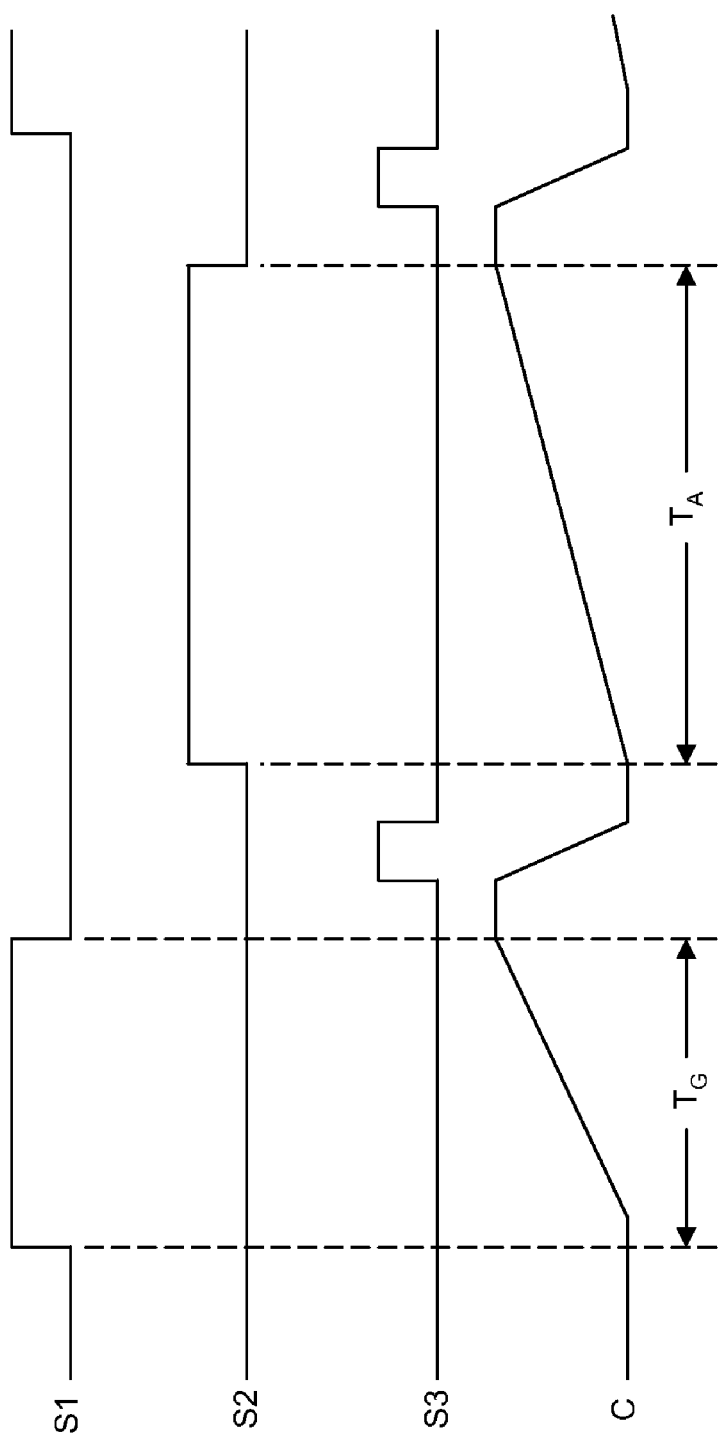
FIGS. 2a and 2b are diagrams illustrating the operation of the rearview mirror system in FIG. 1.
Figure 2B:
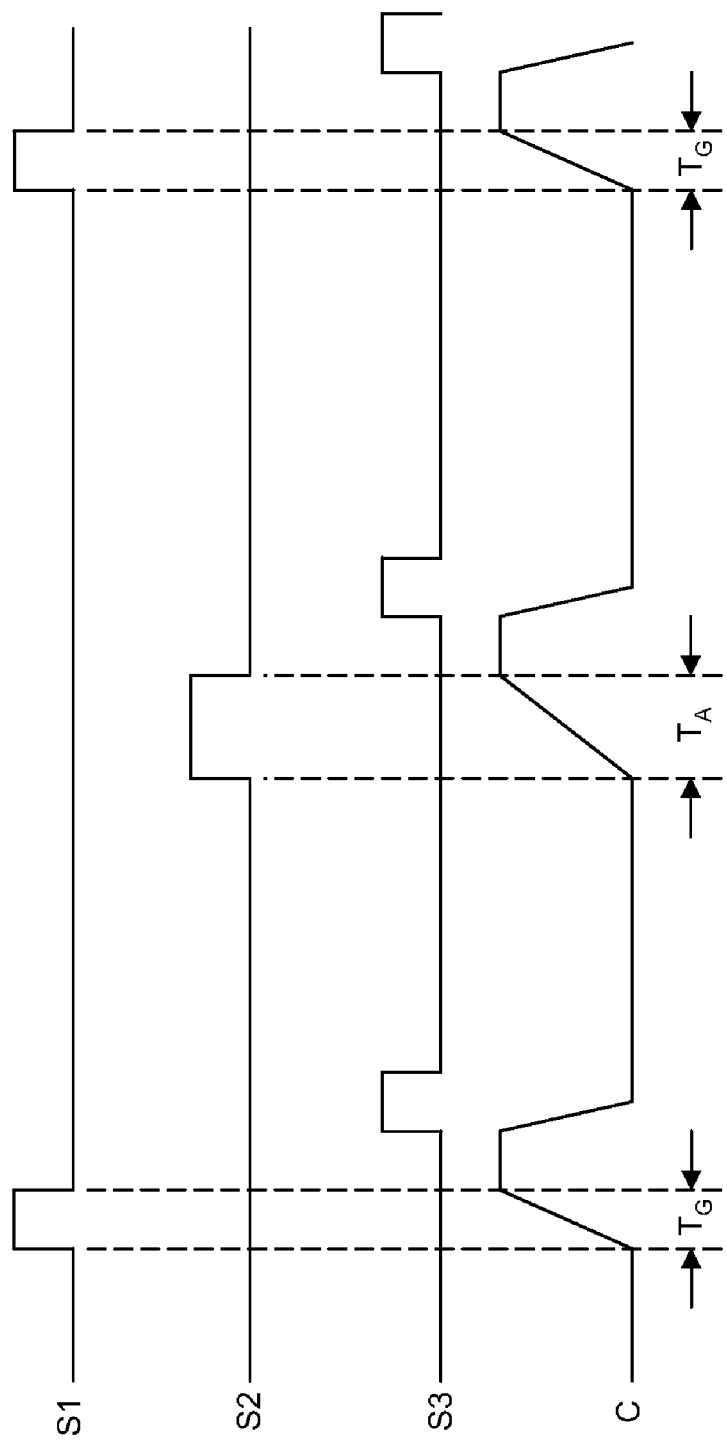

FIG. 2a illustrates a situation in which glare light sensor G is sensing a relatively low glare light level, and ambient light sensor A is sensing a relatively low ambient light level. This results in relatively long accumulation periods Tg and Ta. FIG. 2b illustrates a situation where glare light sensor G senses a relatively high glare light level, and ambient light sensor A senses a relatively high ambient light level. Therefore, in the situation illustrated in FIG. 2b, accumulation periods Tg and Ta are relatively short. Controller 16 responds to the length of accumulation periods Tg and Ta in order to determine a ratio of glare light level to ambient light level, or G/A. By determining the ratio G/A and by utilizing common capacitor C and comparator 26, causes of common mode error are significantly reduced. This is because any errors will be common to both determinations Tg and Ta. Therefore, when a ratio is taken, the common sources of errors are cancelled as would be understood by the skilled artisan. The initiation of a cycle of determination of Tg and Ta may be initiated at the end of the prior determination of Tg and Ta. This would provide a free running system. Alternatively, each cycle could be initiated at a fixed time that is set in order to accommodate a maximum allowable value. This may simplify the software run by microcomputer 16. However, both techniques are equally effective at determining G/A.

As disclosed in commonly assigned U.S. Pat. No. 4,793,690 issued to Gahan et al., the disclosure of which is hereby incorporated herein by reference, it is known that the glare tolerance $G_T$ may be calculated by the following equation:

$$G_T = CM^N + B; \quad (1)$$

where C and B are constants, M is a measure of modified ambient light level, and N is a constant. Modified ambient light level utilizes time-adapted filtering to remove transients from the sensed ambient light and to match the adaptation of the eye as taught in the '690 patent, reference above. N may be varied, such as between 0.8 and 1.3, to adjust the shape of the resulting curve.

Figure 8:
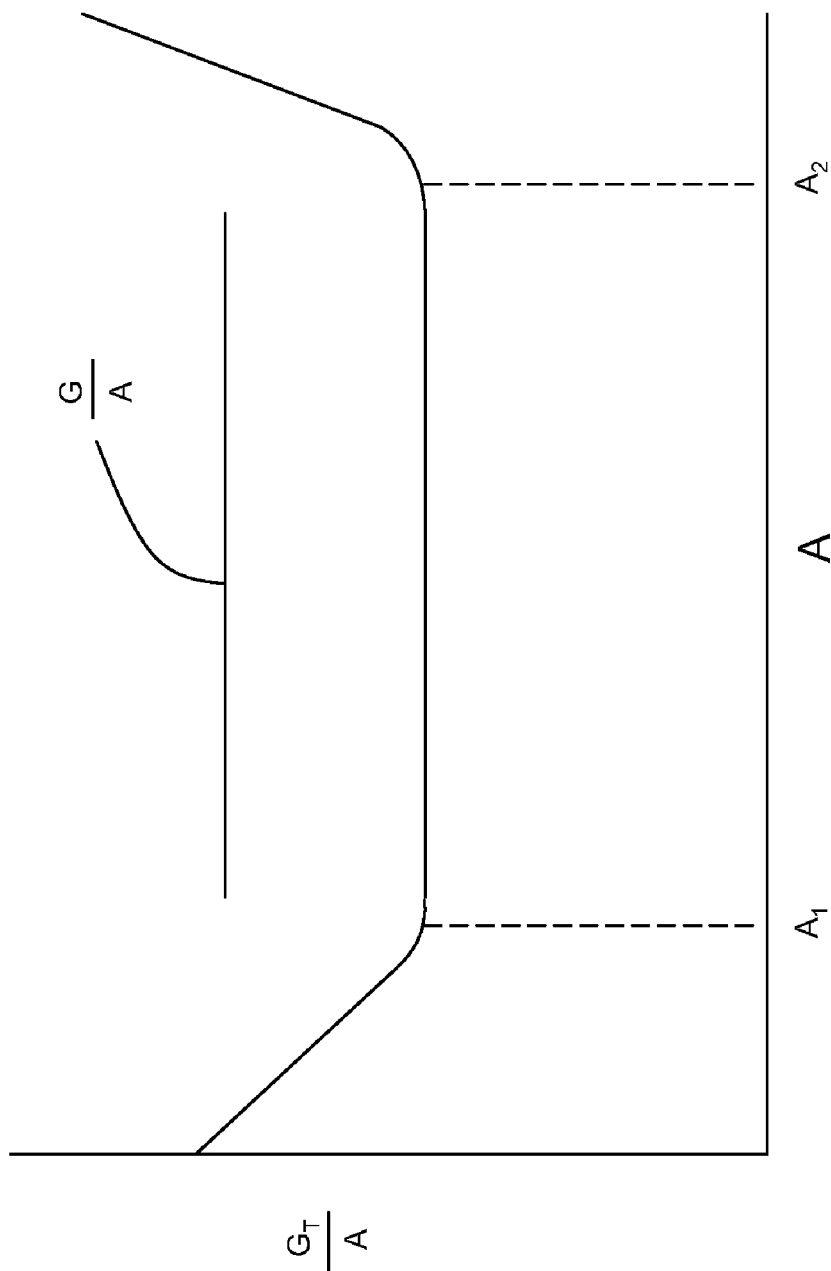
FIG. 8 is a diagram illustrating the operation of the rearview mirror system in FIG. 1.

For values of N that are close to unity, the ratio of $G_T/A$ is reasonably linear as illustrated between points A1 and A2 in FIG. 8. The circuit 14 determines a value of G/A, which is also a ratio, as illustrated by a generally horizontal line in FIG. 8. Conveniently, controller 16 may make a straightforward comparison of the value of G/A as measured by circuit 14 and compare it with the value of GT/A and generate an appropriate drive signal with driver 20 in order to adjust the reflectance level of reflective element 12 to bring the value of glare sensed by the driver in line with the glare tolerance of the driver. This ratio of G/A causes variables that may affect the sensing of glare and ambient light to be common and, therefore, cancelled. One exception may be dark current generated by the sensors, which varies by the duration of the exposure time. Therefore, other supplemental techniques are provided herein to further reduce dark current errors.

In the illustrated embodiment, glare light sensor G and ambient light sensor A may be semiconductor devices, namely, phototransistors, photodiodes, or the like. Such semiconductor devices are relatively inexpensive and readily available and do not create difficulties with end-of-product-life disposal. The present invention is capable of producing a value of G/A that is relatively linear within the range of 0.01 lux to 100 lux.

Figure 3:
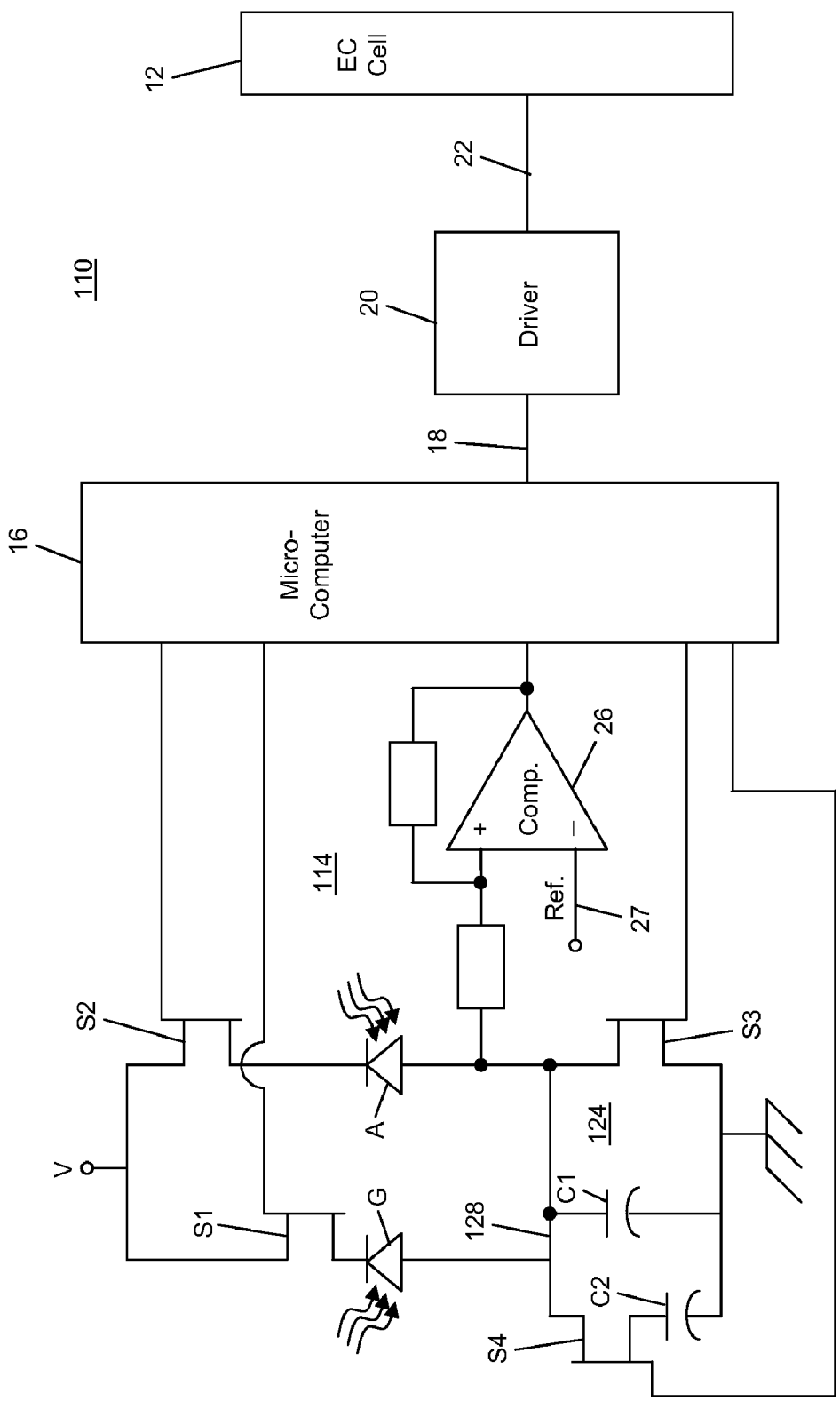
FIG. 3 is the same view as FIG. 1 of an alternative embodiment thereof.

In an embodiment illustrated in FIG. 3, a vehicle rearview mirror system 110 includes a circuit 114 with a second capacitor C2 and a fourth switch S4. Switch S4 is under the control of controller 16 and is operable to selectively place capacitor C2 in parallel with capacitor C1. Under generally low ambient light conditions, controller 16 would cause switch S4 to be opened, thereby using only capacitor C1 to be charged by the respective glare light sensor G and ambient light sensor A. In relatively high light conditions, controller 16 could cause switch S4 to be conducting thereby placing capacitor C2 in parallel with C1. This allows the voltage at terminal 128 to accumulate to the level of the reference voltage in a longer accumulation period than capacitor C1 alone. Thus, controller 16 may utilize capacitor C1 alone and determine whether the level of voltage on terminal 128 reaches the reference within the maximum duration set for the accumulation period. It should be understood that, although one additional switched capacitor is illustrated in FIG. 3, a series of switched capacitors may be individually controlled by controller or microcomputer 16 in a similar fashion, as would be understood by the skilled artisan. This technique makes better use of the resolution of the microcomputer's internal timer.

Figure 4:
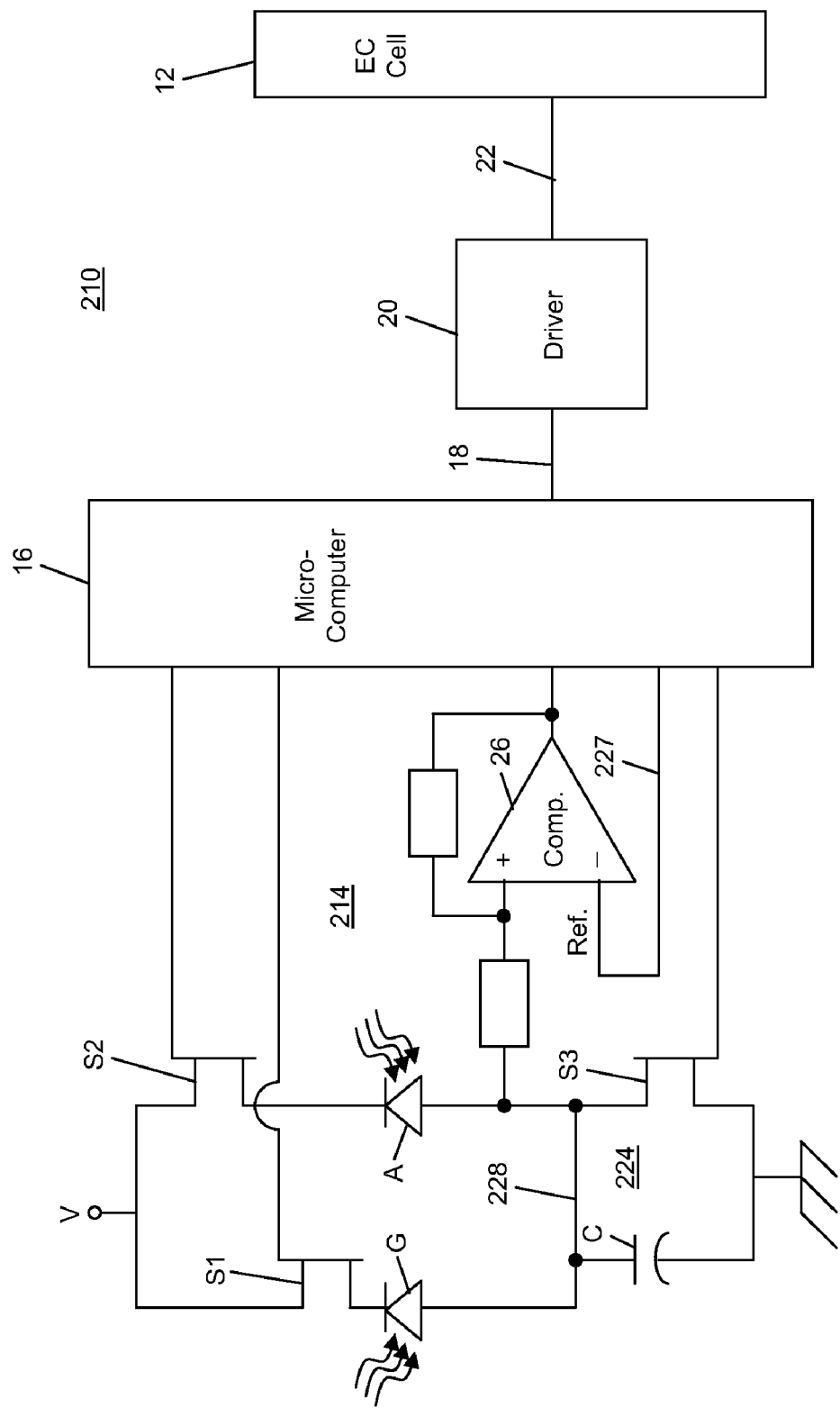
FIG. 4 is the same view as FIG. 1 of another alternative embodiment thereof.

A vehicle rearview mirror system 210 is illustrated in FIG. 4 in which a voltage reference 227 provided to comparator 26 is produced by microcomputer 16. Controller or microcomputer 16 may produce reference 227 at a level which is a function of light levels sensed by the circuit 224. Thus, for example, in high light conditions, controller 16 may set reference 227 at a relatively high level because the voltage at terminal 228 will rise relatively quickly in the manner set forth in FIG. 2a. In contrast, during low light conditions, controller 16 may produce a lower reference voltage 227. In this fashion, the voltage at terminal 228 will reach the reference 227 at a shorter accumulation period than would otherwise occur. This allows the accumulation period to be within a shorter range of periods and thereby accommodate a greater range of light levels by the vehicle rearview mirror system.

Figure 5:
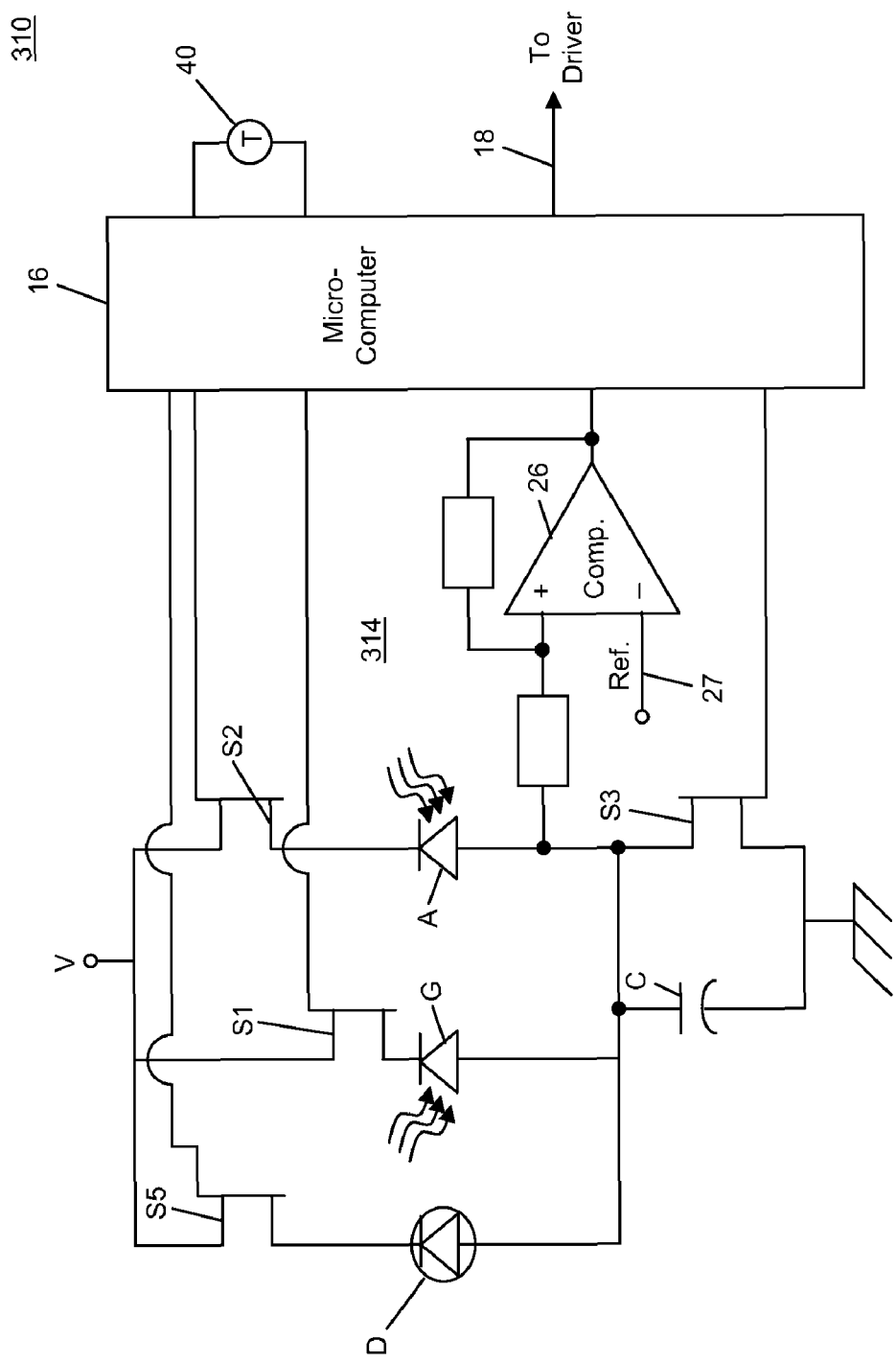
FIG. 5 is the same view as FIG. 1 of yet another alternative embodiment thereof.

Although the vehicle rearview mirror system, according to the various embodiments disclosed herein, reduces sources of common mode errors, it may be desirable to provide additional functions to further reduce dark-current errors. For example, at low light levels and relatively high temperatures, dark currents can greatly exceed the current produced as a result of sensed light. It may be desirable to provide compensation for temperature variations. In an embodiment illustrated in FIG. 5, a vehicle rearview mirror system 310 includes a circuit 314 having a temperature compensation in the form of shielded light sensor D which is not exposed to light. In the same fashion that controller 16 accumulates charge with one of the glare sensors G and ambient sensors A connected with capacitor C, circuit 314 also selectively connects sensor D with capacitor C during a third accumulation period. This is accomplished by controller or microcomputer 16 actuating a fifth switch S5 to place sensor D in series between voltage source V and capacitor C. Because the dark current produced by sensor D will be similar to the dark current produced by sensor G and sensor A, controller 16 can compensate for dark current by utilizing the information obtained from measuring the dark current produced by sensor D.

Circuit 314 may also include temperature compensation in the form of a temperature sensor 40 monitored by microcomputer 16 in order to measure ambient temperature conditions. Based upon a lookup table or a formula stored in controller or microcomputer 16, controller 16 may utilize the temperature reading detected by temperature sensor 40 in order to determine a value of dark current produced by sensors G and A. This also provides an additional technique for further reducing the effect of dark currents especially during extreme temperature conditions, It should be understood that the temperature compensation techniques disclosed herein can be used separately or in combination.

As indicated above, automatic dimming circuitry used in electrochromic mirror assemblies (such as disclosed in U.S. Pat. Nos. 4,793,690; 4,886,960; 4,799,768; 4,443,057 and 4,917,477, the entire disclosures of which are hereby incorporated by reference herein) may utilize one or more (typically two) photo sensors (such as photo resistors or photo diodes or photo transistors) to detect glaring and/or ambient lighting. For example, a silicon photo sensor, such as a TSL235R Light-to-Frequency converter (available from Texas Advanced Optoelectronic Solutions Inc. of Plano, Tex.) can be used as such photo sensors. Such light-to-frequency converters comprise the combination of a silicon photodiode and a current-to-frequency converter on a single monolithic CMOS integrated circuit. Alternately, a photo sensor that converts ambient light to a digital signal capable of direct feed into a microprocessor (or into a vehicle bus system, such as a LIN or CAN system or an SMBus) can be used, For example, a TSL2550 light sensor can be used that converts light intensity to a digital output (and is available from Texas Advanced Optoelectronic Solutions Inc, of Plano, Tex.). The TSL2550 Light-to-Digital photo sensor uses an all-silicon technique that combines two photodetectors to measure light brightness as perceived by the human eye, and calculates light intensity in units of lux. One photo sensor is sensitive to both visible and infrared light, while the other is sensitive only to infrared light. By such a combination, the infrared component of detected light is compensated for, and the output of the part is approximate the response of the human eye, thus obviating a need for a photopic filter. The ratio of infrared to visible light can be calculated and used to determine the type of light source (for example, incandescent or sunlight). Thus, for example, glaring light from headlamps (typically incandescent or high intensity discharge) can be distinguished from moonlight, sunlight, neon light, and the like.

Figure 6:
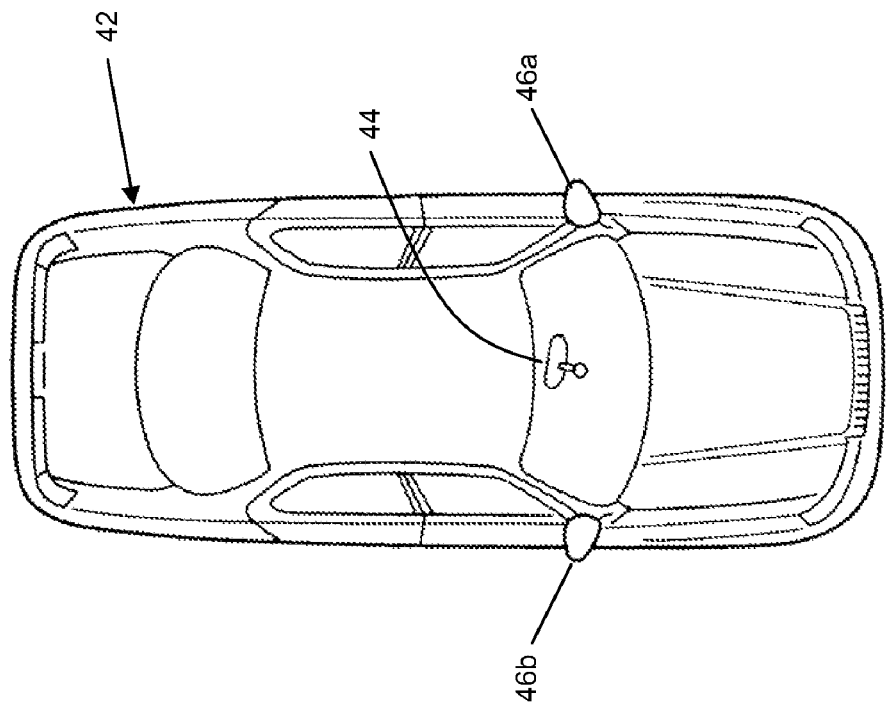
FIG. 6 is a top plan view of a vehicle equipped with a rearview mirror system in accordance with the present invention.
Figure 7:
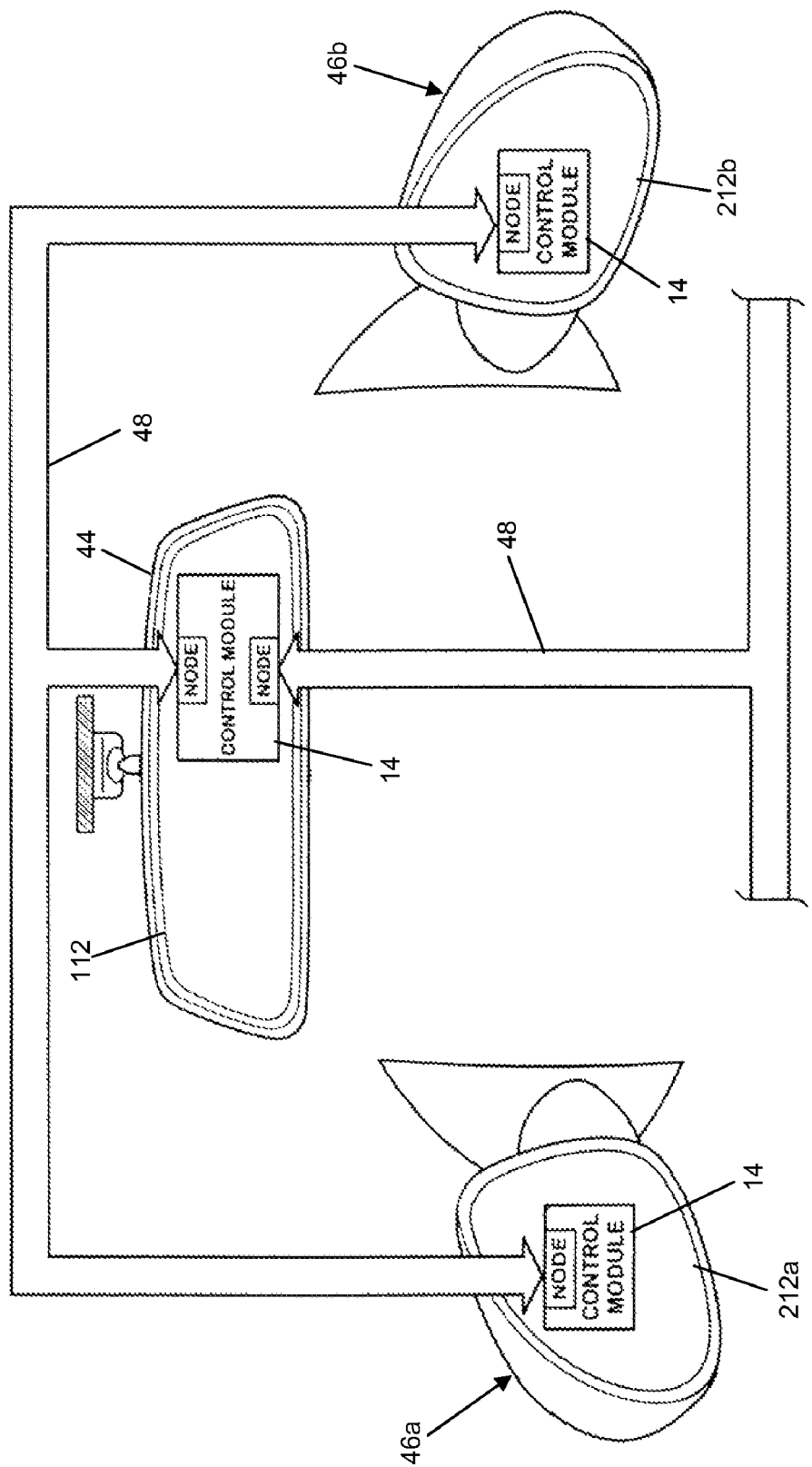
FIG. 7 is a block diagram of the vehicle rearview mirror system of FIG. 6.

Vehicle rearview minor system 10 is illustrated in FIG. 6 in use with a vehicle 42. Vehicle 42 is shown having an interior rearview mirror assembly 44 and exterior rearview mirror assembly 46a on a driver side of the vehicle and exterior rearview minor assembly 46b on a passenger side of the vehicle. Circuit 14 may produce reflectance levels for an interior reflective element 112 in interior rearview mirror assembly 44 and the exterior reflective elements 212a in exterior mirror assembly 46a and 212b in exterior mirror assembly 46b. Circuit 14 may be positioned in interior rearview mirror assembly 14 with the reflective elements produced therein communicated via vehicle communication bus 48. Alternatively, circuit 14 may be positioned in more than one of the mirror assemblies 44, 46a, 46b and may individually control the respective reflectance level for that mirror reflective element. If circuit 14 is positioned within interior rearview mirror assembly 44, ambient light sensor A may face in a generally forward direction with respect to the vehicle and glare sensor G facing generally rearward with respect to the direction of the vehicle. Alternatively, circuit 14 may be positioned in an exterior rearview mirror assembly 46a, 46b with glare light sensor G and ambient light sensor A facing generally rearward with respect to the vehicle. In such circumstances, the glare light sensor may be aimed along a generally horizontal axis and the ambient light sensor along another axis that deviates from the horizontal axis. The deviation may be between 10 degrees and 70 degrees, as disclosed in commonly assigned U.S. Pat. No. 5,659,423 issued to Schierbeek et al., the disclosure of which is hereby incorporated herein by reference.

Circuits 114, 214, 314 may be manufactured using application specific integrated circuit (ASIC) technology. In the case of a circuit position within interior rearview minor assembly 44, an ASIC could be utilized combining one of the light sensors G and A with all or a portion of the rest of circuits 14, 214 and 314 with the other light sensor G, A by itself or with the portion of the circuit not included with the other light sensor. If both light sensors are on the same side of the circuit, such as disclosed in Schierbeek et al. '423, referenced above, a single ASIC could be utilized, Thus, the present invention provides automatic dimming circuitry without the use of tandem light sensors and without light signals that are integrated over predetermined integration periods.

Figure 9:
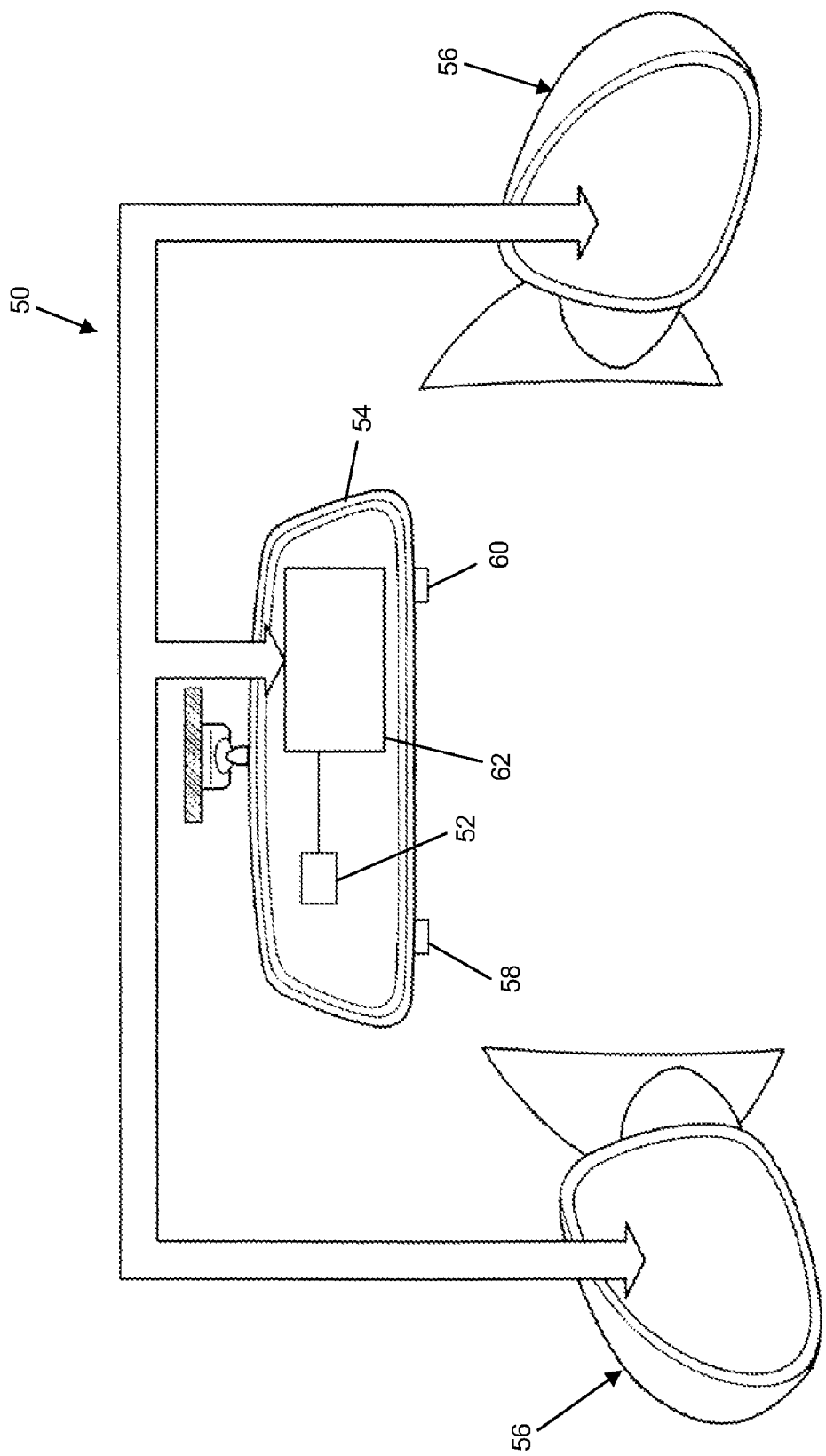
FIG. 9 is a block diagram of another vehicle rearview mirror system in accordance with the present invention.

Referring now to FIG. 9, an electrochromic rearview mirror system 50 for a vehicle may include a mirrored element and a display 52 which is viewable through the mirrored element. The rearview mirror system 50 may include an interior rearview mirror assembly 54 and/or one or more exterior, side mounted rearview mirror assemblies 56. The electrochromic mirror assembly or assemblies 54, 56 may utilize the principles disclosed in commonly assigned U.S. Pat. Nos. 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 or 4,712,879, which are hereby incorporated herein by reference, or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein, and in U.S. patent application Ser. No. 09/792,002, filed Feb. 26, 2001 by Schofield et al. for VIDEO MIRROR SYSTEMS INCORPORATING AN ACCESSORY MODULE, now U.S. Pat. No. 6,690,268, which is hereby incorporated herein by reference, The display 52 may comprise a display-on-demand type of display, such as the types disclosed in commonly assigned U.S. Pat. Nos. 5,668,663 and 5,724,187, and/or in U.S. patent applications Ser. No. 10/054,633, filed Jan. 22, 2002 by Lynam et al. for VEHICULAR LIGHTING SYSTEM, now U.S. Pat. No. 7,195,381; and Ser. No. 09/792,002, filed Feb. 26, 2001 by Schofield et al. for VIDEO MIRROR SYSTEMS INCORPORATING AN ACCESSORY MODULE, now U.S. Pat. No. 6,690,268, which are all hereby incorporated herein by reference. With such a display, it is not only desirable to adjust the display brightness according to ambient lighting conditions, but it is also desirable to adjust the display brightness such that a sufficient contrast ratio is maintained against the variable background brightness of the reflected scene. Also, it may be desirable to compensate for changes in transmission of the electrochromic device effected to control rearward glare sources, in order that the display brightness appears to be maintained at a generally constant level.

The present invention may include an interior rearview mirror assembly which is mounted to an interior surface of the windshield or at the headliner of the vehicle. The interior rearview mirror assembly may include a transflective one way mirror, such as disclosed in commonly assigned U.S. patent application Ser. No. 10/054,633, filed Jan. 22, 2002 by Lynam et al. for VEHICULAR LIGHTING SYSTEM, now U.S. Pat. No. 7,195,381, which is hereby incorporated herein by reference. The mirror reflective element (behind which the display element or screen is disposed so that the image displayed is visible by viewing through the mirror reflective element) of the interior mirror assembly may comprise a transflective mirror reflector such that the mirror reflective element is significantly transmitting to visible light incident from its rear (i.e. the portion furthest from the driver in the vehicle), with at least about 15% transmission preferred, at least about 20% transmission more preferred, and at least about 25% transmission most preferred, while the mirror reflective element is simultaneously substantially reflective to visible light incident from its front (i.e. the position closest to the driver when the interior mirror assembly is mounted in the vehicle), with at least about 60% reflectance preferred, at least about 70% reflectance more preferred, and at least about 75% reflectance most preferred.

A transflective electrochromic reflective mirror element may be used (such as is disclosed in U.S. patent application Ser. No. 09/793,002, entitled VIDEO MIRROR SYSTEMS INCORPORATING AN ACCESSORY MODULE, filed Feb. 26, 2001, now U.S. Pat. No. 6,690,268 and in U.S. Pat. Nos. 5,668,663 and 5,724,187, the entire disclosures of which are hereby incorporated by reference herein) that comprises an electrochromic medium sandwiched between two substrates. The front substrate (i.e. closest to the driver when the interior mirror assembly is mounted in the vehicle) may comprise a glass substrate having a transparent electronic conductive coating (such as indium tin oxide or doped tin oxide) on its inner surface (and contacting the electrochromic medium). Optionally, the front substrate of the twin-substrate electrochromic cell that sandwiches the electrochromic medium comprises a glass substrate having a thickness of about 1.6 millimeters or less; preferably, about 1.1 millimeters or less. The rear substrate (i.e. furthest from the driver when the interior mirror assembly is mounted in the vehicle) may comprise a glass substrate having a transflective mirror reflector on the surface thereof that the electrochromic medium contacts (such a configuration being referred to as a "third-surface" reflector in the electrochromic mirror art).

For example, the mirror reflector may comprise a transparent semiconductor/metal conductor/transparent semiconductor multilayer stack, such an indium tin oxide/silver/indium tin oxide stack. For example, a third-surface electrochromic mirror reflective element may be used comprising a front substrate comprising an about 1.1 mm thick glass substrate having a half-wave indium tin oxide (ITO) coating of about 12 ohms/square sheet resistance on its inner surface; a rear substrate comprising an about 1.6 mm thick glass substrate having a transflective mirror reflector thereon comprising an about 350 angstrom thick silver metal layer sandwiched between an about 800 angstrom thick indium tin oxide transparent semiconductor layer and another about 800 angstrom thick indium tin oxide transparent semiconductor layer; and with an electrochromic solid polymer matrix medium, such as is disclosed in U.S. Pat. No. 6,245,262 (the entire disclosure of which is hereby incorporated by reference herein), disposed between the transflective mirror reflector of the rear substrate and the half-wave indium tin oxide layer of the front substrate. Visible light reflectivity of the transflective electrochromic mirror element may be about 60-65%; and light transmission may be about 20-25%. For example, with a ITT LCD video display disposed behind the rear substrate of such a third-surface transflective electrochromic mirror reflective element in a "display-on-demand" configuration, the presence of (and image displayed by) the video display screen is only principally visible to the driver (who views through the transflective mirror reflective element) when the video display element is powered so as to project light from the rear of the mirror reflective element.

Optionally, in applications in which a TFT LCD video screen is implemented, a single high-intensity power LED, such as a white light emitting LED comprising a Luxeon™ Star Power LXHL-MW1A white light emitting LED having (at a 25 degree Celsius junction temperature) a minimum forward voltage of 2.55 volts, a typical forward voltage of 3.42 volts, a maximum forward voltage of 3.99 volts, a dynamic resistance of 1 ohm and a forward current of 350 milliamps, and available from Lumileds Lighting LLC of San Jose, Calif., may be used as a backlight for the TFT LCD video screen. Alternately, a plurality of such single high-intensity power LEDs (such as an array of two or of four such power LEDs) may be placed behind the TFT LCD video screen so that the intense white light projected from the individual single high-intensity power LEDs passes through the TFT LCD element and through the transflective electrochromic element, and may produce a display intensity as viewed by the driver of at least about 200 candelas/sq. meter; more preferably at least about 300 candelas/sq. meter; and most preferably at least about 400 candelas/sq. meter. Alternately, cold cathode vacuum fluorescent sources/tubes may be used for backlighting and optionally can be used in conjunction with LED backlighting.

The electrochromic rearview mirror system of the present invention includes two image sensors or illumination sensors: one forward facing sensor 58 which may provide a basis for calculating or determining a value representative of ambient lighting conditions around the vehicle, and one rearward facing sensor 60 which may be useful in determining the degree of glare impinging the mirror surface and consequently being reflected toward the driver's eyes. The sensor or sensors 58, 60 may be imaging sensors, and may be imaging array sensors, such as a CMOS sensor or a CCD sensor or the like, such as disclosed in commonly assigned U.S. Pat. Nos. 5,550,677; 5,670,935; 5,796,094; and 6,097,023, which are hereby incorporated herein by reference. Optionally, the control 62 of the present invention may be operable to receive data (which is indicative of ambient light levels) from one or more existing imaging sensors on the vehicle, such as an imaging sensor for a vehicle vision system, such as a vehicle vision system utilizing the principles disclosed in U.S. Pat. Nos. 5,550,677; 5,670,935; and 6,201,642, and/or in U.S. patent application Ser. No. 09/199,907, filed Nov. 25, 1998 by Bos et al, for WIDE ANGLE IMAGE CAPTURE SYSTEM FOR VEHICLE, now U.S. Pat. No. 6,717,610, and Ser. No. 09/372,915, filed Aug. 12, 1999 by Bos et al. for VEHICLE IMAGING SYSTEM WITH STEREO IMAGING, now U.S. Pat. No. 6,396,397, which are hereby incorporated herein by reference, an imaging sensor for a lane departure warning system, an imaging or light sensor for a rain sensor, such as disclosed in U.S. Pat. Nos. 6,313,454; 6,353,392; and 6,320,176, and/or the like, without affecting the scope of the present invention.

A value representative of ambient lighting conditions may otherwise be derived from a combination of forward and rearward facing light sensors. The resultant value representative of the ambient light level is used to estimate the sensitivity of the driver's eyes and thus provide the appropriate degree of intensity reduction of the reflected image to avoid reduced forward vision capability.

The electrochromic rearview mirror system of the present invention, as equipped or associated with a forward facing light sensor 58 and a rearward facing light sensor 60, may calculate an ambient light value AV based on the value of the forward facing light sensor or a combination of values from the forward and rearward facing light sensors. The ambient light value AV is representative of the ambient light level surrounding the vehicle.

The ambient light value AV is then used to determine a driver's eyes' sensitivity value SV, based on a relationship between the ambient light value AV and the sensitivity value SV, as described in commonly assigned U.S. Pat. Nos. 4,793,690 and 4,799,768, which are hereby incorporated herein by reference. The value of the sensitivity SV may be divided into two values: SV1, which represents the value above which a light source is considered a discomfort at a particular ambient lighting level, and SV2, which represents the value above which a light source becomes debilitating at a particular ambient lighting level. A debilitating condition arises when the ability to discern detail in the general field of view is reduced. A relationship is selected where the sensitivity value SV, as a function of the ambient light value AV, is between the sensitivity values SV1 and SV2.

A light value GV, which is representative of the quantity of light impinging the rearward facing sensor, and thus the rearview mirror surface, is determined from the value of the rearward facing light sensor. In those cases where the sensed light value GV exceeds the maximum acceptable sensitivity value SV, a modulating effect ME of the electrochromic cell in the light path is used to reduce the light value GV toward the sensitivity value SV, such that GV*ME=SV, to the extent that a sufficient modulating effect is available. The degree of modulation ME may be controlled by the voltage V applied to the electrochromic element, so that the degree of modulation ME is a function of the applied voltage V.

When a display is associated with the rearview mirror, the intensity of the display is typically controlled between a maximum intensity value I1 and a minimum intensity value I2 as a function of the ambient light condition. The display intensity I is thus a function of the ambient light value AV and time t, and may be a step function, a linear function, a logarithmic function, or any other continuous function, without affecting the scope of the present invention. The time t is included in the relationship to avoid any potentially annoying rapid fluctuations of the display intensity. When the display is viewed through a non-reflecting window or region of the electrochromic cell, it is desirable to correct for the varying modulation of the cell. The modulation effect ME is based on a double pass through the electrochromic medium, while the light from the display only passes once through the electrochromic medium. Therefore, the display intensity may be corrected to a corrected intensity value $I_{(c)}$, according to the following relationship:

$$I_{(c)} = I * ME^{-1/2}. \qquad (2)$$

When a display-on-demand information display system is used, bright rearward scenes reduce the contrast ratio between the active regions of the display and the reflected background scene. In order to correct this situation and render the display readable, it is desirable to increase the display illumination by a function of the ratio of the brightness of the rearward scene (after modulation, if such modulation is present) to the ambient light value which controls the nominal illumination intensity. In other words, the display illumination or intensity I may be controlled according to the following relationship:

$$I = Fn((ME*GV)/AV). \qquad (3)$$

The function of equation (3) may have a value of one (1) for all cases where the value of (ME*GV)/AV is less than one, since the relationship or function of the intensity I (which is a function of the ambient light level or value AV and time t, as discussed above) may establish an appropriate display intensity regardless of the darkness of the background field in such situations. Therefore, the relationship controlling the fully compensated display intensity $I_{(fc)}$ becomes the following:

$$I_{(fc)} = Fn(ME*GV)/AV) * Fn(AV,t) * ME^{-1/2}. \qquad (4)$$

Therefore, the present invention provides an electrochromic rearview mirror system which incorporates a display and a display intensity control, which further includes an intensity adjustment responsive in at least part of its operating range to the brightness of the rearward scene. The display intensity control is operable as a function of the ambient light levels (from a forward facing light sensor and/or a rearward facing light sensor) and a value representative of the amount of light impinging the rearward facing rearview mirror surface. The display intensity control is further responsive to a modulating effect of the electrochromic cell.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. An interior rearview mirror system for a vehicle, said interior rearview mirror system comprising:
   an interior rearview mirror assembly having a transflective electrochromic reflective element, said transflective electrochromic reflective element comprising a front substrate having a first surface and a second surface opposite said first surface and said transflective electrochromic reflective element comprising a rear substrate having a third surface and a fourth surface opposite said third surface, wherein said third surface of said rear substrate is closer to the driver of a vehicle than said fourth surface of said rear substrate when said interior rearview mirror assembly is mounted in a vehicle equipped with said interior rearview mirror system;
   wherein said transflective electrochromic reflective element comprises a mirror reflector that partially reflects light and that partially transmits light, wherein said mirror reflector is disposed at said third surface of said rear substrate and wherein a transparent electrically conductive layer is disposed at said second surface of said front substrate;
   wherein said transflective electrochromic reflective element comprises an electrochromic medium disposed between said second surface of said front substrate and said third surface of said rear substrate;
   wherein said interior rearview mirror assembly comprises an ambient light sensor operable to sense ambient light;
   wherein said interior rearview mirror assembly comprises a glare light sensor operable to sense glare light;
   wherein said interior rearview mirror assembly comprises a control operable to establish a reflectance level of said transflective electrochromic reflective element, wherein said control is responsive to light detection by at least one of said ambient light sensor and said glare light sensor;
   a backlit video screen disposed behind said transflective electrochromic reflective element and operable to display information through said mirror reflector of said transflective electrochromic reflective element and viewable through said mirror reflector of said transflective electrochromic reflective element by a driver of the vehicle when said backlit video screen is displaying information, and substantially non-viewable by the driver of the vehicle when said backlit video screen is not displaying information;
   a display intensity control for adjusting display intensity of said backlit video screen, said display intensity control adjusting display intensity responsive to a light detection by at least one of said glare light sensor and said ambient light sensor; and
   wherein display intensity of said backlit video screen is adjusted as a function of a ratio of a glare light value sensed by said glare light sensor to an ambient light value sensed by said ambient light sensor, and wherein said function comprises at least one of (a) a step function, (b) linear function, (c) a logarithmic function and (d) a continuous function.

2. The interior rearview mirror system of claim 1, wherein said control establishes a reflectance level of said reflective element responsive to a ratio of a glare light value to an ambient light value.

3. The interior rearview mirror system of claim 2, wherein said control establishes said reflectance level within a relatively linear value of said ratio of glare light value to ambient light value.

4. The interior rearview mirror system of claim 1, wherein said function is influenced by a modulating effect of said transflective electrochromic reflective element.

5. The interior rearview mirror system of claim 4, wherein said display intensity control controls display intensity in accordance with the equation:

$$I = Fn((ME*GV)/AV);$$

where I is the display intensity, ME is said modulating effect, GV is the glare light value, and AV is the ambient light value, and wherein display intensity as calculated by said equation has a value of one when the value of (ME*GV)/AV is less than one.

6. The interior rearview mirror system of claim 5, wherein said modulation effect ME is based on a double pass of light through said electrochromic medium.

7. The interior rearview mirror system of claim 6, wherein display intensity may be corrected to a corrected intensity value $I_{(c)}$, in accordance with the following equation:

$$I_{(c)} = I*ME^{-1/2}.$$

8. The interior rearview mirror system of claim 1, wherein said ambient light sensor comprises a silicon photo-sensor and associated circuitry commonly formed as an integrated circuit and wherein said glare light sensor comprises a silicon photo-sensor and associated circuitry commonly formed as an integrated circuit.

9. The interior rearview mirror system of claim 8, wherein said associated circuitry of said ambient light sensor comprises a current-to-frequency converter and wherein said associated circuitry of said glare light sensor comprises a current-to-frequency converter.

10. The interior rearview mirror system of claim 1, wherein said ambient light sensor comprises a silicon photo-sensor and associated circuitry commonly formed as a monolithic CMOS integrated circuit and wherein said glare light sensor comprises a silicon photo-sensor and associated circuitry commonly formed as a monolithic CMOS integrated circuit.

11. The interior rearview mirror system of claim 1, wherein said control comprises a charge accumulation device, a comparison function and a controller, said comparison function comparing an output of said charge accumulation device with a reference, said controller selectively connecting said glare sensor and said ambient light sensor with said charge accumulation device.

12. The interior rearview mirror system of claim 11, wherein said control alternates connecting said glare light sensor and said ambient light sensor with said charge accumulation device.

13. The interior rearview mirror system of claim 11, wherein said control comprises compensation to adapt said control to changes in light levels sensed by said glare and ambient light sensors and wherein said compensation comprises a plurality of voltage reference levels and said control selectively compares an output of said charge accumulation device with one of said voltage reference levels.

14. The interior rearview mirror system of claim 11, wherein said control comprises a drive function that produces a drive signal that is applied to said reflective element, said drive function comprising a switching device, said control operating said switching device at a particular duty cycle to establish the reflectance level of said reflective element.

15. The interior rearview mirror system of claim 1, comprising temperature compensation of at least one of said glare light sensor and said ambient light sensor, wherein said temperature compensation is responsive to a reference sensor that is not exposed to light.

16. An interior rearview mirror system for a vehicle, said interior rearview mirror system comprising;
an interior rearview mirror assembly having a transflective electrochromic reflective element, said transflective electrochromic reflective element comprising a front substrate having a first surface and a second surface opposite said first surface and said transflective electrochromic reflective element comprising a rear substrate having a third surface and a fourth surface opposite said third surface, wherein said third surface of said rear substrate is closer to the driver of a vehicle than said fourth surface of said rear substrate when said interior rearview mirror assembly is mounted in a vehicle equipped with said interior rearview mirror system;
wherein said transflective electrochromic reflective element comprises a mirror reflector that partially reflects light and that partially transmits light, wherein said mirror reflector is disposed at said third surface of said rear substrate and wherein a transparent electrically conductive layer is disposed at said second surface of said front substrate;
wherein said transflective electrochromic reflective element comprises an electrochromic medium disposed between said second surface of said front substrate and said third surface of said rear substrate;
wherein said interior rearview mirror assembly comprises an ambient light sensor operable to sense ambient light and wherein said ambient light sensor comprises a silicon photo-sensor and associated circuitry commonly formed as a monolithic CMOS integrated circuit;
wherein said interior rearview mirror assembly comprises a glare light sensor operable to sense glare light and wherein said glare light sensor comprises a silicon photo-sensor and associated circuitry commonly formed as a monolithic CMOS integrated circuit;
wherein said interior rearview mirror assembly comprises a control operable to establish a reflectance level of said transflective electrochromic reflective element, wherein said control is responsive to light detection by at least one of said ambient light sensor and said glare light sensor;
a backlit video screen disposed behind said transflective electrochromic reflective element and operable to display information through said mirror reflector of said transflective electrochromic reflective element and viewable through said mirror reflector of said transflective electrochromic reflective element by a driver of the vehicle when said backlit video screen is displaying information, and substantially non-viewable by the driver of the vehicle when said backlit video screen is not displaying information;
a display intensity control for adjusting display intensity of said backlit video screen, said display intensity control adjusting display intensity responsive to a light detection by at least one of said glare light sensor and said ambient light sensor; and
wherein display intensity of said backlit video screen is adjusted as a function of a ratio of a glare light value sensed by said glare light sensor to an ambient light value sensed by said ambient light sensor, and wherein said function comprises a step function.

17. The interior rearview mirror system of claim 16, wherein said function is influenced by a modulating effect of said transflective electrochromic reflective element.

18. The interior rearview mirror system of claim 17, wherein said display intensity control controls display intensity in accordance with the equation:

$$I = Fn((ME*GV)/AV);$$

where I is the display intensity, ME is said modulating effect, GV is the glare light value, and AV is the ambient light value, and wherein display intensity as calculated by said equation has a value of one when the value of (ME*GV)/AV is less than one.

19. The interior rearview mirror system of claim 18, wherein said modulation effect ME is based on a double pass of light through said electrochromic medium.

20. The interior rearview mirror system of claim 19, wherein display intensity may be corrected to a corrected intensity value $I_{(c)}$, in accordance with the following equation:

$$I_{(c)} = I*ME^{-1/2}.$$

21. An interior rearview mirror system for a vehicle, said interior rearview mirror system comprising:
an interior rearview mirror assembly having a transflective electrochromic reflective element, said transflective electrochromic reflective element comprising a front substrate having a first surface and a second surface opposite said first surface and said transflective electrochromic reflective element comprising a rear substrate having a third surface and a fourth surface opposite said third surface, wherein said third surface of said rear substrate is closer to the driver of a vehicle than said fourth surface of said rear substrate when said interior rearview mirror assembly is mounted in a vehicle equipped with said interior rearview mirror system;
wherein said transflective electrochromic reflective element comprises a mirror reflector that partially reflects light and that partially transmits light, wherein said mirror reflector is disposed at one of (a) said third surface of said rear substrate and (b) said fourth surface of said rear substrate, and wherein a transparent electrically conductive layer is disposed at said second surface of said front substrate;
wherein said transflective electrochromic reflective element comprises an electrochromic medium disposed between said second surface of said front substrate and said third surface of said rear substrate;
wherein said interior rearview mirror assembly comprises an ambient light sensor operable to sense ambient light and wherein said ambient light sensor comprises a silicon photo-sensor and associated circuitry commonly formed as a monolithic CMOS integrated circuit;
wherein said interior rearview mirror assembly comprises a glare light sensor operable to sense glare light and wherein said glare light sensor comprises a silicon photo-sensor and associated circuitry commonly formed as a monolithic CMOS integrated circuit;

wherein said interior rearview mirror assembly comprises a control operable to establish a reflectance level of said transflective electrochromic reflective element, wherein said control is responsive to light detection by at least one of said ambient light sensor and said glare light sensor;

a backlit video screen disposed behind said transflective electrochromic reflective element and operable to display information through said mirror reflector of said transflective electrochromic reflective element and viewable through said mirror reflector of said transflective electrochromic reflective element by a driver of the vehicle when said backlit video screen is displaying information, and substantially non-viewable by the driver of the vehicle when said backlit video screen is not displaying information;

a display intensity control for adjusting display intensity of said backlit video screen, said display intensity control adjusting display intensity responsive to a light detection by at least one of said glare light sensor and said ambient light sensor; and wherein display intensity of said backlit video screen is adjusted as a function of a ratio of a glare light value sensed by said glare light sensor to an ambient light value sensed by said ambient light sensor, and wherein said function comprises at least one of (a) a step function, (b) a linear function, (c) a logarithmic function and (d) a continuous function.

22. The interior rearview mirror system of claim 21, wherein said function is influenced by a modulating effect of said transflective electrochromic reflective element.

23. The interior rearview mirror system of claim 21, wherein said display intensity control controls display intensity in accordance with the equation:

$$I = Fn((ME*GV)/AV);$$

where I is the display intensity, ME is said modulating effect, GV is the glare light value; and AV is the ambient light value, and wherein display intensity as calculated by said equation has a value of one when the value of (ME*GV)/AV is less than one.

* * * * *

UNITED STATES PATENT AND TRADEMARK OFFICE
CERTIFICATE OF CORRECTION

| | | |
|---|---|---|
| PATENT NO. | : 8,106,347 B2 | |
| APPLICATION NO. | : 13/037440 | |
| DATED | : January 31, 2012 | |
| INVENTOR(S) | : John P. Drummond and Kenneth Schofield | |

It is certified that error appears in the above-identified patent and that said Letters Patent is hereby corrected as shown below:

Column 2
Line 4, "signals," should be --signals.--
Line 40, "scene," should be --scene.--
Line 51, "minor" should be --mirror--
Line 65, "minor" should be --mirror--

Column 3
Line 37, "of . mass-produced" should be --of mass-produced--

Column 5
Line 34, "S1, Referring" should be --S1. Referring--

Column 7
Line 57, "conditions," should be --conditions.--

Column 8
Line 9, "used," should be --used.--
Line 12, "Inc," should be --Inc.--
Line 27, "minor" should be --mirror--
Line 31, "minor" should be --mirror--
Line 59, "minor" should be --mirror--
Line 66, "utilized," should be --utilized.--

Column 9
Line 31, "reference," should be --reference.--

Column 10
Line 51, "ITT" should be --TFT--

Signed and Sealed this
Fifth Day of June, 2012

David J. Kappos
*Director of the United States Patent and Trademark Office*

CERTIFICATE OF CORRECTION (continued)
U.S. Pat. No. 8,106,347 B2

Column 11
Line 36, "al," should be --al.--

Column 12
Line 24, "condition," should be --condition.--

Column 14
Line 4, Claim 1, Insert --a-- after "(b)"

Column 15
Line 15, Claim 16, "comprising;" should be --comprising:--

Column 18
Line 16, Claim 23, "value;" should be --value,--